US010708643B2

(12) United States Patent
Hirabayashi et al.

(10) Patent No.: US 10,708,643 B2
(45) Date of Patent: *Jul. 7, 2020

(54) INFORMATION PROCESSING APPARATUS AND INFORMATION PROCESSING METHOD

(71) Applicant: SONY CORPORATION, Tokyo (JP)

(72) Inventors: Mitsuhiro Hirabayashi, Tokyo (JP); Yoichi Yagasaki, Tokyo (JP); Nobuaki Izumi, Kanagawa (JP); Mitsuru Katsumata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/368,075

(22) Filed: Mar. 28, 2019

(65) Prior Publication Data

US 2019/0222881 A1 Jul. 18, 2019

Related U.S. Application Data

(63) Continuation of application No. 15/564,883, filed as application No. PCT/JP2016/065865 on May 30, 2016, now Pat. No. 10,313,728.

(30) Foreign Application Priority Data

Jun. 12, 2015 (JP) ................. 2015-119360

(51) Int. Cl.
G06F 3/00 (2006.01)
G06F 13/00 (2006.01)
(Continued)

(52) U.S. Cl.
CPC ... *H04N 21/2668* (2013.01); *H04N 21/21815* (2013.01); *H04N 21/235* (2013.01);
(Continued)

(58) Field of Classification Search
CPC ......... H04N 21/2668; H04N 21/21815; H04N 21/235; H04N 21/2662; H04N 21/4728; H04N 21/816; H04N 21/845
See application file for complete search history.

(56) References Cited

U.S. PATENT DOCUMENTS 9,894,422 B2 * 2/2018 Hwang ............ H04N 21/23614
2012/0081508 A1 * 4/2012 Kitazato ................ H04N 5/247
348/36
(Continued)

FOREIGN PATENT DOCUMENTS

CN 103141079 A 6/2013
EP 2624551 A1 8/2013
(Continued)

OTHER PUBLICATIONS

Information technology—Coding of audio-visual objects—Part 12: ISO base media file format, Technical Corrigendum 5, ISO/IEC JTC 1/SC 29, Dec. 12, 2011, STD Version 2. 1c2, ISO/IEC JTC 1/SC 29/WG 11.

(Continued)

Primary Examiner — Mulugeta Mengesha
(74) Attorney, Agent, or Firm — Paratus Law Group, PLLC

(57) ABSTRACT

There is provided an information processing apparatus and an information processing method which are capable of reliably recognizing the position on a screen of an image made up of a plurality of divided images or the positions on the screen of divided images compatible with encoded streams. A position protruding out of a screen is set as the position on the screen of an end image that is made up of a left end image and a right end image compatible with encoded streams. The present disclosure is applicable to a file generating apparatus, etc. of an information processing system that distributes encoded streams of an entire celestial (Continued)

sphere image as an image of a moving-image content to a moving-image playback terminal according to a process equivalent to MPEG-DASH, for example.

14 Claims, 29 Drawing Sheets

(51) Int. Cl.
| | |
|---|---|
| *H04N 5/445* | (2011.01) |
| *H04N 21/2668* | (2011.01) |
| *H04N 21/4728* | (2011.01) |
| *H04N 21/218* | (2011.01) |
| *H04N 21/81* | (2011.01) |
| *H04N 21/845* | (2011.01) |
| *H04N 21/235* | (2011.01) |
| *H04N 21/2662* | (2011.01) |

(52) U.S. Cl.
CPC ..... *H04N 21/2662* (2013.01); *H04N 21/4728* (2013.01); *H04N 21/816* (2013.01); *H04N 21/845* (2013.01)

(56) References Cited

U.S. PATENT DOCUMENTS

| | | |
|---|---|---|
| 2013/0229546 A1 | 9/2013 | Furumura et al. |
| 2014/0176542 A1* | 6/2014 | Shohara ............... G06T 15/205 |
| | | 345/420 |

FOREIGN PATENT DOCUMENTS

| | | |
|---|---|---|
| EP | 2627071 A1 | 8/2013 |
| JP | 2014-127001 A | 7/2014 |
| WO | WO 00/08889 A1 | 2/2000 |

OTHER PUBLICATIONS

Nov. 13, 2018, European Search Report issued for related EP application No. 16807314.6.
Denoual et al., Interactive ROI streaming with DASH, International Organisation for Standardisation ISO/IEC JTC1/SC29/WG11, Apr. 2013, pp. 1-8, Incheon, South Korea.
Ng et al., The compression issues of panoramic video, Proceedings of 2001 International Symposium on Intelligent Multimedia, Video and Speech Processing, May 2-4, 2001, pp. 36-39, Hong Kong.
Sep. 19, 2019, Chinese Office Action issued for related CN Application No. 201680032810.2.

* cited by examiner

FIG. 4

- If the source content is a panorama image or a celestial sphere dynamic image that the right side of the image is connected to the left side of image, the value of total_width may be such that, for each descriptor using this value of total_width, the sum of object_x and object_width is larger than total_width. In this case, it is interprited as wraparound.

- If the source content is a panorama image or a celestial sphere dynamic image that the top side of the image is connected to the bottom side of image, the value of total_height may be such that, for each descriptor using this value of total_height, the sum of object_y and object_height is larger than total_height. In this case, it is interprited as wraparound.

FIG. 5

- If the source content is a panorama image or a celestial sphere dynamic image that the right side of the image is connected to the left side of image, this should be signaled in this SRD scheme or other scheme in the same MPD. And the value of total_width may be such that, for each descriptor using this value of total_width, the sum of object_x and object_width is larger than total_width. In this case, it is interprited as wraparound.

- If the source content is a panorama image or a celestial sphere dynamic image that the top side of the image is connected to the bottom side of image, this should be signaled in this SRD sceme or other scheme in the same MPD. And the value of total_height may be such that, for each descriptor using this value of total_height, the sum of object_y and object_height is larger than total_height. In this case, it is interprited as wraparound.

FIG. 7 total_width/total_heigh

- The value of total_width shall be such that, for each descriptor using this value of total_width, the sum of object_x and object_width is smaller or equal to total_width.

- The value of total_height shall be such that, for each descriptor using this value of total_height, the sum of object_y and object_height is smaller or equal to total_height.

FIG. 8

```xml
<?xml version="1.0" encoding="UTF-8"?>
<MPD
  xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011 DASH-MPD.xsd"
  [...]>

<Period>
    <AdaptationSet...]>
        <SupplementalProperty schemeIdUri="urn:mpeg:dash:srd:2014"
            value="1, 0, 0, 1920, 1080, 1920, 1080, 1"/>
        <Representation id="1" bandwidth="2000000" >
            <BaseURL>stream1.mp4</BaseURL>
        </Representation>
    </AdaptationSet>
    <AdaptationSet [...]>
        <EssentialProperty schemeIdUri="urn:mpeg:dash:srd:2014"
            value="1, 0, 0, 3840, 540, 3840, 2160, 2"/>
        <Representation id="2" bandwidth="2000000">
            <BaseURL>stream2.mp4</BaseURL>
        </Representation>
    </AdaptationSet>
    <AdaptationSet [...]>
        <EssentialProperty schemeIdUri="urn:mpeg:dash:srd:2014"
            value="1, 960, 540, 1920, 1080, 3840, 2160, 2"/>
        <Representation id="3" bandwidth="2000000">
            <BaseURL>stream3.mp4</BaseURL>
        </Representation>
    </AdaptationSet>
[...]
    <AdaptationSet [...]>
        <EssentialProperty schemeIdUri="urn:mpeg:dash:srd:2014"
            value="1, 0, 1620, 3840, 540, 3840, 2160, 2"/>
        <Representation id="4" bandwidth="2000000">
            <BaseURL>stream4.mp4</BaseURL>
        </Representation>
    </AdaptationSet>
<!--2 spatial objects are in a single stream -->
    <AdaptationSet [...] >
        <EssentialProperty schemeIdUri="urn:mpeg:dash:srd:2014"
            value="1, 2880, 540, 1920, 1080, 3840, 2160, 2"/>
        <Representation id="5" bandwidth="2000000"[...]>
        <BaseURL>stream5.mp4</BaseURL>
        </Representation>
    </AdaptationSet>

</Period>
</MPD>
```

FIG.14

```
<?xml version="1.0" encoding="UTF-8"?>
<MPD
  xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011 DASH-MPD.xsd"
  [...]>

<Period>
  <AdaptationSet...]>
    <SupplementalProperty schemeIdUri="urn:mpeg:dash:srd:2014"
        value="1, 0, 0, 1920, 1080, 1920, 1080, 1"/>
    <Representation id="1" bandwidth="2000000" >
      <BaseURL>stream1.mp4</BaseURL>
    </Representation>
  </AdaptationSet>
  <AdaptationSet [...]>
    <EssentialProperty schemeIdUri="urn:mpeg:dash:srd:2014"
        value="1, 0, 0, 3840, 540, 3840, 2160, 2"/>
    <Representation id="2" bandwidth="2000000">
      <BaseURL>stream2.mp4</BaseURL>
    </Representation>
  </AdaptationSet>
  <AdaptationSet [...]>
    <EssentialProperty schemeIdUri="urn:mpeg:dash:srd:2014"
        value="1, 960, 540, 1920, 1080, 3840, 2160, 2"/>
    <Representation id="3" bandwidth="2000000">
      <BaseURL>stream3.mp4</BaseURL>
    </Representation>
  </AdaptationSet>
[...]
  <AdaptationSet [...]>
    <EssentialProperty schemeIdUri="urn:mpeg:dash:srd:2014"
        value="1, 0, 1620, 3840, 540, 3840, 2160, 2"/>
    <Representation id="4" bandwidth="2000000">
      <BaseURL>stream4.mp4</BaseURL>
    </Representation>
  </AdaptationSet>
<!--2 spatial objects are in a single stream -->
  <AdaptationSet [...] >
    <Representation id="5" bandwidth="2000000"[...]>
      <BaseURL>stream5.mp4</BaseURL>
      <SubRepresentation
        level="1" bandwidth="512000"
        width="960" height="1080" [...]>
        <EssentialProperty schemeIdUri="urn:mpeg:dash:srd:2014"
            value="1, 2880, 540, 960, 1080, 3840, 2160, 2"/>
      </SubRepresentation>
      <SubRepresentation
        level="2" bandwidth="512000"
        width="960" height="1080" [...]>
        <EssentialProperty schemeIdUri="urn:mpeg:dash:srd:2014"
            value="1, 0, 540, 960, 1080, 3840, 2160, 2"/>
      </SubRepresentation>
    </Representation>
  </AdaptationSet>
</Period>
</MPD>
```

FIG.17

```
<?xml version="1.0" encoding="UTF-8"?>
<MPD
  xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011 DASH-MPD.xsd"
  [...]>

<Period>
    <AdaptationSet...]>
      <SupplementalProperty schemeIdUri="urn:mpeg:dash:srd:2014"
          value="1, 0, 0, 1920, 1080, 1920, 1080, 1"/>
      <Representation id="1" bandwidth="2000000" >
        <BaseURL>stream1.mp4</BaseURL>
      </Representation>
    </AdaptationSet>
    <AdaptationSet [...]>
      <EssentialProperty schemeIdUri="urn:mpeg:dash:srd:2014"
          value="1, 0, 0, 3840, 540, 3840, 2160, 2"/>
      <Representation id="2" bandwidth="2000000">
        <BaseURL>stream2.mp4</BaseURL>
      </Representation>
    </AdaptationSet>
    <AdaptationSet [...]>
      <EssentialProperty schemeIdUri="urn:mpeg:dash:srd:2014"
          value="1, 960, 540, 1920, 1080, 3840, 2160, 2"/>
      <Representation id="3" bandwidth="2000000">
        <BaseURL>stream3.mp4</BaseURL>
      </Representation>
    </AdaptationSet>
[...]
    <AdaptationSet [...]>
      <EssentialProperty schemeIdUri="urn:mpeg:dash:srd:2014"
          value="1, 0, 1620, 3840, 540, 3840, 2160, 2"/>
      <Representation id="4" bandwidth="2000000">
        <BaseURL>stream4.mp4</BaseURL>
      </Representation>
    </AdaptationSet>
<!--2 spatial objects are in a single stream  -->
    <AdaptationSet [...] >
      <Representation id="5" bandwidth="2000000"[...]>
        <BaseURL>stream5.mp4</BaseURL>
        <SubRepresentation
            level="2" dependencyLevel="1" bandwidth="512000"
            codecs="hvt1.1.2.H93.B0" width="960" height="1080" [...]>
          <EssentialProperty schemeIdUri="urn:mpeg:dash:srd:2014"
              value="1, 2880, 540, 960, 1080, 3840, 2160, 2"/>
        </SubRepresentation>
        <SubRepresentation
            level="3" dependencyLevel="1" bandwidth="512000"
            codecs="hvt1.1.2.H93.B0" width="960" height="1080" [...]>
          <EssentialProperty schemeIdUri="urn:mpeg:dash:srd:2014"
              value="1, 0, 540, 960, 1080, 3840, 2160, 2"/>
        </SubRepresentation>
      </Representation>
    </AdaptationSet>

</Period>
</MPD>
```

FIG. 22

```xml
<?xml version="1.0" encoding="UTF-8"?>
<MPD
  xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011 DASH-MPD.xsd"
  [...]>

<Period>
<!-- 4 mosaic video streams are in a single stream -->
    <AdaptationSet [...] >
      <Representation id="1" bandwidth="2000000"[...]>
        <BaseURL>stream.mp4</BaseURL>
        <SubRepresentation
          level="1"  bandwidth="512000"
          width="960" height="540" [...]>
          <EssentialProperty schemeIdUri="urn:mpeg:dash:srd:2014"
              value="1, 0, 0, 960, 540, 1920, 1080"/>
          <SupplementalProperty schemeIdUri="urn:mpeg:dash:alternative:2015"
              value="http://example.com/a_service/my.mpd"/>
        </SubRepresentation>
        <SubRepresentation
          level="2"  bandwidth="512000"
          width="960" height="540" [...]>
          <EssentialProperty schemeIdUri="urn:mpeg:dash:srd:2014"
              value="1, 960, 0, 960, 540, 1920, 1080"/>
          <SupplementalProperty schemeIdUri="urn:mpeg:dash:alternative:2015"
              value="http://example.com/b_service/my.mpd"/>
        </SubRepresentation>
        <SubRepresentation
          level="3"  bandwidth="512000"
          width="960" height="540" [...]>
          <EssentialProperty schemeIdUri="urn:mpeg:dash:srd:2014"
              value="1, 0, 540, 960, 540, 1920, 1080"/>
          <SupplementalProperty schemeIdUri="urn:mpeg:dash:alternative:2015"
              value="http://example.com/c_service/my.mpd"/>
        </SubRepresentation>
        <SubRepresentation
          level="4"  bandwidth="512000"
          width="960" height="540" [...]>
          <EssentialProperty schemeIdUri="urn:mpeg:dash:srd:2014"
              value="1, 960, 540, 960, 540, 1920, 1080"/>
          <SupplementalProperty schemeIdUri="urn:mpeg:dash:alternative:2015"
              value="http://example.com/d_service/my.mpd"/>
        </SubRepresentation>
      </Representation>
    </AdaptationSet>

</Period>
</MPD>
```

FIG.23

```xml
<?xml version="1.0" encoding="UTF-8"?>
<MPD
  xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011 DASH-MPD.xsd"
  [...]>

<Period>
<!-- 4 mosaic video streams are in a single stream -->
    <AdaptationSet [...] >
      <Representation id="1" bandwidth="2000000"[...]>
        <BaseURL>stream.mp4</BaseURL>
        <SubRepresentation
          level="3"  bandwidth="512000"
          width="960" height="540" [...]>
          <EssentialProperty schemeIdUri="urn:mpeg:dash:srd:2014"
             value="1, 0, 0, 960, 540, 1920, 1080"/>
          <SupplementalProperty schemeIdUri="urn:mpeg:dash:alternative:2015"
             value="http://example.com/c_service/my.mpd"/>
        </SubRepresentation>
        <SubRepresentation
          level="4"  bandwidth="512000"
          width="960" height="540" [...]>
          <EssentialProperty schemeIdUri="urn:mpeg:dash:srd:2014"
             value="1, 960, 0, 960, 540, 1920, 1080"/>
          <SupplementalProperty schemeIdUri="urn:mpeg:dash:alternative:2015"
             value="http://example.com/d_service/my.mpd"/>
        </SubRepresentation>
        <SubRepresentation
          level="1"  bandwidth="512000"
          width="960" height="540" [...]>
          <EssentialProperty schemeIdUri="urn:mpeg:dash:srd:2014"
             value="1, 0, 540, 960, 540, 1920, 1080"/>
          <SupplementalProperty schemeIdUri="urn:mpeg:dash:alternative:2015"
             value="http://example.com/a_service/my.mpd"/>
        </SubRepresentation>
        <SubRepresentation
          level="2"  bandwidth="512000"
          width="960" height="540" [...]>
          <EssentialProperty schemeIdUri="urn:mpeg:dash:srd:2014"
             value="1, 960, 540, 960, 540, 1920, 1080"/>
          <SupplementalProperty schemeIdUri="urn:mpeg:dash:alternative:2015"
             value="http://example.com/b_service/my.mpd"/>
        </SubRepresentation>
      </Representation>
    </AdaptationSet>

</Period>
</MPD>
```

Mrstitle: INFORMATION PROCESSING APPARATUS AND INFORMATION PROCESSING METHOD

INFORMATION PROCESSING APPARATUS AND INFORMATION PROCESSING METHOD

CROSS REFERENCE TO PRIOR APPLICATION

This application is a continuation of U.S. patent application Ser. No. 15/564,883 (filed on Oct. 6, 2017), which is a National Stage Patent Application of PCT International Patent Application No. PCT/JP2016/065865 (filed on May 30, 2016) under 35 U.S.C. § 371, which claims priority to Japanese Patent Application No. 2015-119360 (filed on Jun. 12, 2015), which are all hereby incorporated by reference in their entirety.

TECHNICAL FIELD

The present disclosure relates to an information processing apparatus and an information processing method, and more particularly to an information processing apparatus and an information processing method which are capable of reliably recognizing the position on a screen of an image made up of a plurality of divided images or the positions on the screen of divided images compatible with encoded streams.

BACKGROUND ART

In recent years, OTT-V (Over The Top Video) has become mainstream in the streaming services on the Internet. One technique that has started to come into wide use as the fundamental technology for OTT-V is MPEG-DASH (Moving Picture Experts Group phase-Dynamic Adaptive Streaming over HTTP (HyperText Transfer Protocol)) (see, for example, NPL 1).

According to MPEG-DASH, a distribution server provides encoded streams having different bit rates for one moving-image content, and a playback terminal demands encoded streams having an optimum bit rate, thereby realizing adaptive streaming distribution.

MPEG-DASH SRD (Spatial Relationship Description) extension defines SRD indicating the position on a screen of one or more individually encoded regions into which an image of a moving-image content has been divided (see, for example, NPLs 2 and 3). The SRD makes it possible to realize a ROI (Region of Interest) function of spatial adaptation for selectively acquiring an encoded stream of an image of a desired regions, using a bitrate adaptation method for selectively acquiring encoded streams having desired bit rates.

Images of moving-image contents include not only images captured through angles of field by a single camera, but also entire celestial sphere images where images captured horizontally around 360° or vertically around 180° are mapped onto 2D (Two-Dimensional) images (planar images), and panoramic images captured horizontally around 360°. For example, if an entire celestial sphere image is to be divided horizontally into three or more regions and the regions are to be encoded, then since the regions at both horizontal ends represent contiguous images, they can be encoded as one image.

However, inasmuch as the positions on the screen of the regions at both ends are discrete, there are a plurality of positions on the screen of objects to be encoded. According to MPEG-DASH, therefore, the positions on the screen of the regions at both ends cannot be described using an SRD. In other words, an SRD is unable to describe the position on a screen of an image made up of a plurality of divided images compatible with encoded streams.

According to an SRD, the positions on a screen of respective regions and positions on images compatible with encoded streams are described as identical to each other. Therefore, if the positions on a screen of respective regions and positions on images compatible with encoded streams are different from each other, the positions on the screen of the respective regions cannot be described using the SRD. In other words, if the positions on the screen of respective divided images that make up an image and positions on images compatible with encoded streams are different from each other, then an SRD is unable to describe the positions on the screen of the respective divided linages.

CITATION LIST

Patent Literature

[NPL 1]
MPEG-DASH (Dynamic Adaptive Streaming over HTTP) (URL: http://mpeg.chiariglione.org/standards/mpeg-dash/media-presentation-description-and-segment-formats/text-isoiec-23009-12012-dam-1)

[NPL 2]
"Text of ISO/IEC 23009-1:2014 FDAM 2 Spatial Relationship Description, Generalized URL parameters and other extensions," N15217, MPEG111, Geneva, February 2015

[NPL 3]
"WD of ISO/IEC 23009-3 2 nd edition AMD 1 DASH Implementation Guidelines," N14629. MPEG109, Sapporo, July 2014

SUMMARY

Technical Problem

Therefore, it has been desirous of reliably describing the position on a screen of an image made up of a plurality of divided images or the positions on a screen of divided images compatible with encoded streams, so that they can be recognized.

The present disclosure has been made under the circumstances described above, and is aimed at reliably recognizing the position on a screen of an image made up of a plurality of divided images or the positions on a screen of divided images compatible with encoded streams.

Solution to Problem

An information processing apparatus according to a first aspect of the present disclosure is an information processing apparatus including a setting section that sets a position protruding out of a screen as a position on the screen of an image made up of a plurality of divided images compatible with encoded streams.

An information processing method according to the first aspect of the present disclosure corresponds to the information processing apparatus according to the first aspect of the present disclosure.

According to the first aspect of the present disclosure, a position protruding out of a screen is set as a position on the screen of an image made no of a plurality of divided images compatible with encoded streams.

An information processing apparatus according to a second aspect of the present disclosure is an information processing apparatus including an allocator that places an image obtained by decoding encoded streams on a screen, on the basis of a position protruding oat of the screen which is set as a position on the screen of the image which is made up of a plurality of divided images compatible with the encoded streams.

An information processing method according to the second aspect of the present disclosure corresponds to the information processing apparatus according to the second aspect of the present disclosure.

According to the second aspect of the present disclosure, an image obtained by decoding encoded streams is placed on a screen on the basis of a position protruding out of the screen which is set as a positron on the screen of the image which is made up of a plurality of divided images compatible with the encoded streams.

An information processing apparatus according to a third aspect of the present disclosure is an information processing apparatus including a setting section that sets positions on a screen of respective divided images of an image which is made up of a plurality of divided images compatible with encoded streams, in association with positions of the divided images on the image.

An information processing method according to the third aspect of the present disclosure corresponds to the information processing apparatus according to the third aspect of the present disclosure.

According to the third aspect of the present disclosure, positions on a screen of respective divided images of an image which is made up of a plurality of divided images compatible with encoded streams are set in association with positions of the divided images on the image.

An information processing apparatus according to a fourth aspect of the present disclosure is an information processing apparatus including an allocator that places divided images of an image obtained by decoding encoded streams on a screen, on the basis of positions on the screen of the divided images of the image which are set in association with positions on the image which is made up of a plurality of divided images compatible with the encoded streams.

An information processing method according to the fourth aspect of the present disclosure corresponds to the information processing apparatus according to the fourth aspect of the present disclosure.

According to the fourth aspect of the present disclosure, divided images of an image obtained by decoding encoded streams are placed on a screen on the basis of positions on the screen of the divided images of the image which are set in association with positions on the image which is made up of a plurality of divided images compatible with the encoded streams.

The information processing apparatus according to the first through fourth aspects can be implemented by a computer when it executes programs.

In order to implement the information processing apparatus according to the first through fourth aspects, the programs to be executed by the computer can be provided by being transmitted through a transmission medium or recorded on a recording medium.

Advantageous Effects of Invention

According to the first aspect of the present disclosure, information can be set. According to the first aspect of the present disclosure, information can be set in a manner to be able to reliably recognize the position on a screen of an image made up of a plurality of divided images compatible with encoded streams.

According to the second aspect of the present disclosure, information can be acquired. According to the second aspect of the present disclosure, the position on a screen of an image made up of a plurality of divided images compatible with encoded streams can reliably be recognized.

According to the third aspect of the present disclosure, information can be set. According to the third aspect of the present disclosure, information can be set in a manner to be able to reliably recognize positions on a screen of divided images of an image compatible with encoded streams.

According to the fourth aspect of the present disclosure, information can be acquired. According to the fourth aspect of the present disclosure, positrons on a screen of divided images of an image compatible with encoded screams can be reliably recognized.

The advantages described above are not necessarily restrictive in nature, but any of the advantages described in the present disclosure are applicable.

BRIEF INSCRIPTION OF DRAWINGS

FIG. 4 is a diagram illustrative of an example of definition of an SRD in the first embodiment.

FIG. 5 is a diagram illustrative of another example of definition of an SRD in the first embodiment.

FIG. 7 is a diagram illustrative of an example of definition of an SRD.

FIG. 8 is a diagram illustrative of an example of an MPD file in the first embodiment.

FIG. 14 is a diagram depicting an example of an MPD file in the second embodiment.

FIG. 17 is a diagram depicting another example of an MPD file in the second embodiment.

FIG. 22 is a diagram depicting a first example of an MPD file in the third embodiment.

FIG. 23 is a diagram depicting a second example of an MPD file in the third embodiment.

DESCRIPTION OF EMBODIMENTS

Modes (hereinafter referred to as "embodiments") for carrying out the present disclosure will be described below. The description will be given in the following order.

1. First embodiment: Information processing system (FIGS. 1 through 11)
2. Second embodiment: Information processing system (FIGS. 12 through 17)
3. Third embodiment: Information processing system (FIGS. 18 through 28)
4. Fourth embodiment: Computer (FIG. 29)

First Embodiment

Figure 1:
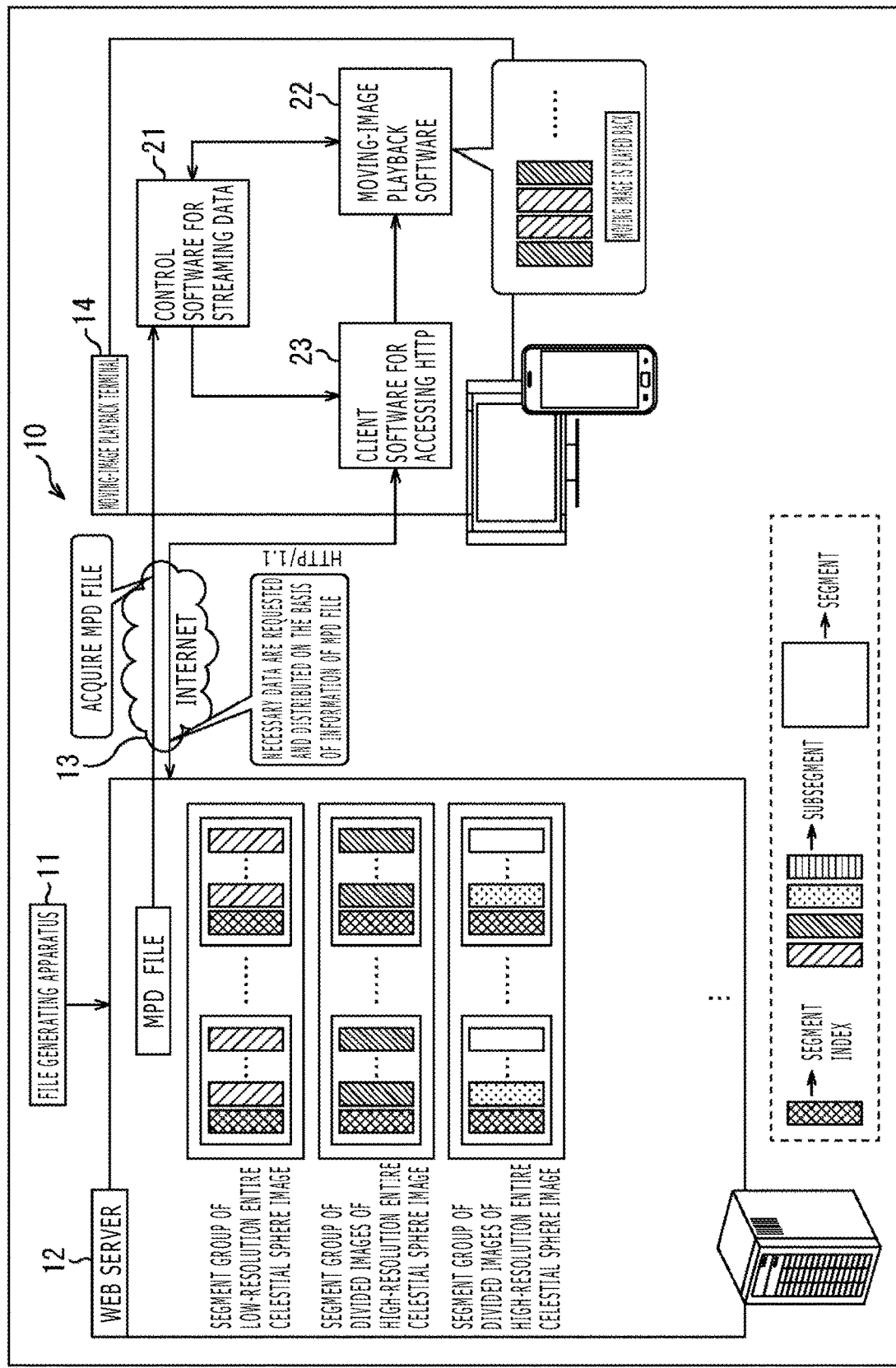
FIG. 1 is a block diagram depicting a configurational example of a first embodiment of an information processing system to which the present disclosure is applied.

Configurational Example of a First Embodiment of an Information Processing System FIG. 1 is a block diagram depicting a configurational example of a first embodiment of an information processing system to which the present disclosure is applied.

An information processing system 10 depicted in FIG. 1 includes a Web server 12 connected to a file generating apparatus 11, and a moving-image playback terminal 14, the Web server 12 and the moving-image playback terminal 14 being connected to each other over the Internet 13.

In the information processing system 10, the Web server 12 distributes encoded streams of an entire celestial sphere image as an image of a moving-image content to the moving-image playback terminal 14 according to a process equivalent to MPEG-DASH.

In the present specification, the entire celestial sphere image refers to an image according to equidistant cylindrical projection for spheres, where an image captured horizontally around 360° or vertically around 180° (hereinafter referred to as "omnidirectional image") is mapped onto a spherical plane. However, the entire celestial sphere image may be an image representing a development of a cube, where an omnidirectional image is mapped onto the cube.

The file generating apparatus 11 (information processing apparatus) of the information processing system 10 encodes a low-resolution entire celestial sphere image to generate a low-resolution encoded stream. The file generating apparatus 11 also independently encodes images divided from a high-resolution entire celestial sphere image to generate high-resolution encoded streams of the respective divided images. The file generating apparatus 11 generates image files by converting the low-resolution encoded stream and the high-resolution encoded streams into files each per time unit called "segment" ranging from several to ten seconds. The file generating apparatus 11 uploads the generated image files to the Web server 12.

The file generating apparatus 11 (setting section) also generates an MPD file (management file) for managing image files, etc. The file generating apparatus 11 uploads the MPD file to the Web server 12.

The Web server 12 stores the image files and the MPD file uploaded from the file generating apparatus 11. In response to a request from the moving-image playback terminal 14, the Web server 12 sends the image files, the MPD file, etc. that have been stored therein to the moving-image playback terminal 14.

The moving-image playback terminal 14 executes software 21 for controlling streaming data (hereinafter referred to as "control software"), moving-image playback software 22, and client software 23 for accessing HTTP (HyperText Transfer Protocol) (hereinafter referred to as "access software"), etc.

The control software 21 is software for controlling data streaming from the Web server 12. Specifically, the control software 21 enables the moving-image playback terminal 14 to acquire the MPD file from the Web server 12.

Based on the MPD file, the control software 21 instructs the access software 23 to send a request for sending encoded streams to be played which are designated by the moving-image playback software 22.

The moving-image playback software 22 is software for playing the encoded streams acquired from the Web server 12. Specifically, the moving-image playback software 22 indicates encoded streams to be played to the control software 21. Furthermore, when the moving-image playback software 22 receives a notification of having started receiving streams from the access software 23, the moving-image playback software 22 decodes the encoded streams received by the moving-image playback terminal 14 into image data. The moving-image playback software 22 combines the decoded image data and outputs the combined image data.

The access software 23 is software for controlling communication with the Web server 12 over the internet 13 using HTTP. Specifically, in response to the instruction from the control software 21, the access software 23 controls the moving-image playback terminal 14 to send a request for sending encoded streams to be played that are included in image files. The access software 23 also controls the moving-image playback terminal 14 to start receiving she encoded streams that are sent from the Web server 12 in response to the request, and supplies a notification of having started receiving streams to the moving-image playback software 22.

Configurational Example of an Image File Generator

Figure 2:
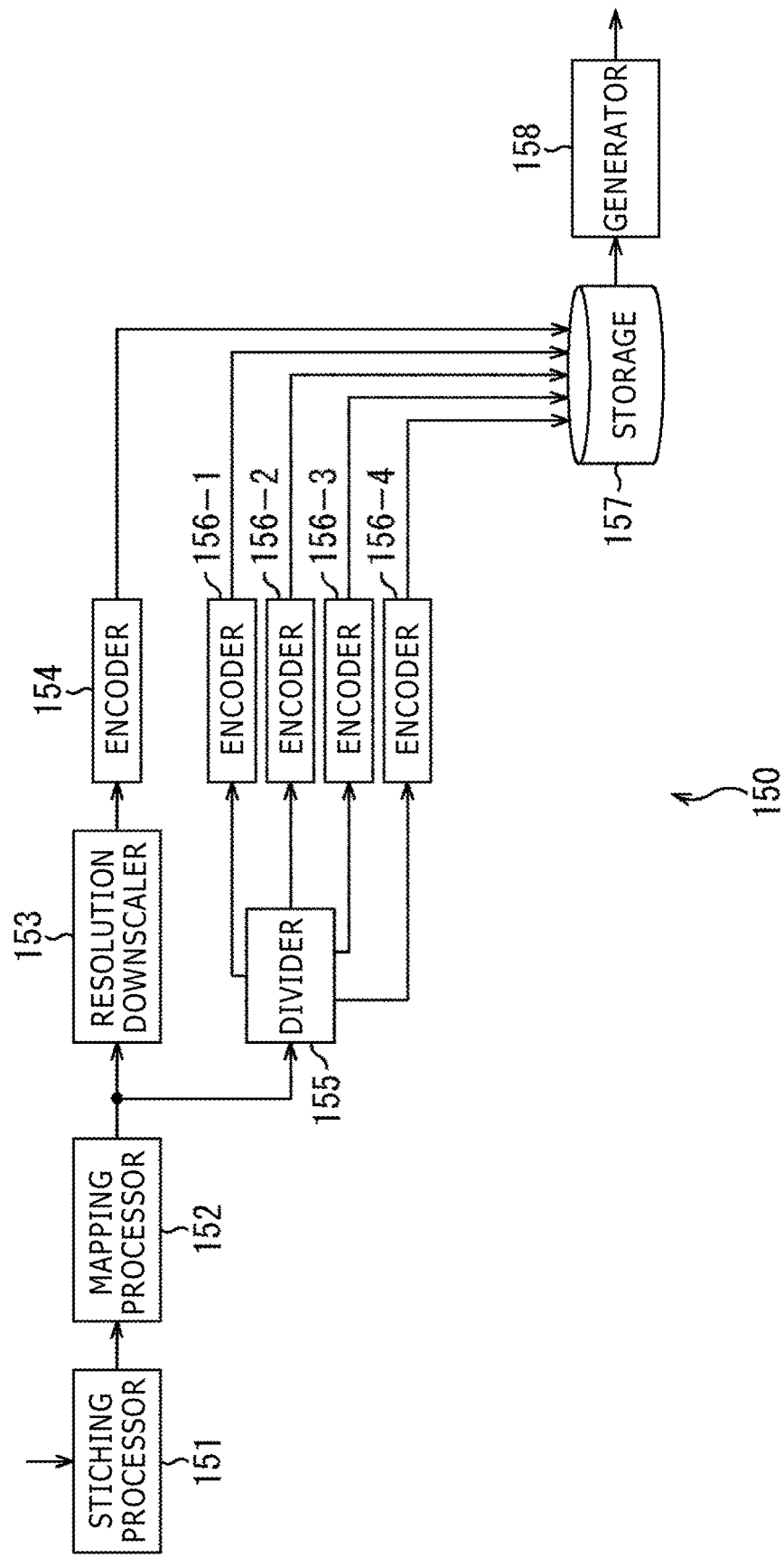
FIG. 2 is a block diagram depicting a configurational example of an image file generator of a file generating apparatus depicted in FIG. 1.

FIG. 2 is a block diagram depicting a configurational example of an image file generator for generating image files, of the file generating apparatus 11 depicted in FIG. 1.

As depicted in FIG. 2, an image file generator 150 includes a stitching processor 151, a mapping processor 152, a resolution downscaler 153, an encoder 154, a divider 155, encoders 156-1 through 156-4, a storage 157, and a generator 158.

The stitching processor 151 equalizes the colors and lightnesses of omnidirectional images supplied from muiti-cameras, not depicted, and join them while removing overlaps. The stitching processor 151 supplies an omnidirectional image obtained as a result to the mapping processor 152.

The mapping processor 152 maps the omnidirectional image supplied from the stitching processor 151 onto a sphere, thereby generating an entire celestial sphere image. The mapping processor 152 supplies the entire celestial sphere image to the resolution downscaler 153 and the divider 155. The stitching processor 151 and the mapping processor 152 may be integrated with each other.

The resolution downscaler 153 reduces the horizontal and vertical resolutions of the entire celestial sphere image supplied from the mapping processor 152 to one-half, thereby downscaling the resolution of the image and generating a low-resolution entire celestial sphere image. The resolution downscaler 153 supplies the low-resolution entire celestial sphere image to the encoder 154.

The encoder 154 encodes the low-resolution entire celestial sphere image supplied from the resolution downscaler 153 according to an encoding process such as AVC (Advanced video Coding), HEV (High Efficiency Video Coding), or the like, thereby generating a low-resolution encoded stream. The encoder 154 supplies the low-resolution encoded stream to the storage 157, which records the supplied low-resolution encoded stream therein.

The divider 155 divides the entire celestial sphere image supplied as a high-resolution entire celestial sphere image from the mapping processor 152 vertically into three regions, and divides the central region horizontally into three regions such that no boundary lies at the center. The divider 155 downscales the resolution of the upper and lower regions among the five divided regions such that the horizontal resolution is reduced to one-half, for example.

The divider 155 supplies a low-resolution upper image, which represents the upper region whose resolution has been downscaled, to the encoder 156-1, and supplies a low-resolution lower image, which represents the lower region whose resolution has been downscaled, to the encoder 156-2.

The divider 155 combines the left end of the left end region of the central region with the right end of the right end region thereof, thereby generating an end image. The divider 155 supplies the end image to the encoder 156-3. The divider 155 also supplies the central one of the central region as a central image to the encoder 156-4.

The encoders 156-1 through 156-4 encode the low-resolution upper image, the low-resolution lower image, the end image, and the central image supplied from the divider 155, according to an encoding process such as AVC, HEVC, or the like. The encoders 156-1 through 156-4 supply encoded streams thus generated as high-resolution streams to the storage 157, which records the supplied high-resolution streams therein.

The storage 157 records therein the single low-resolution encoded stream supplied from the encoder 154 and the four high-resolution encoded streams supplied from the encoders 156-1 through 156-4.

The generator 158 reads the single low-resolution encoded stream and the four high-resolution encoded streams from the storage 157, and converts each of them into files each per segment. The generator 158 transmits the image files thus generated to the Web server 12 depicted in FIG. 1.

Description of an Encoded Stream of an Entire Celestial Sphere Image

Figure 3:
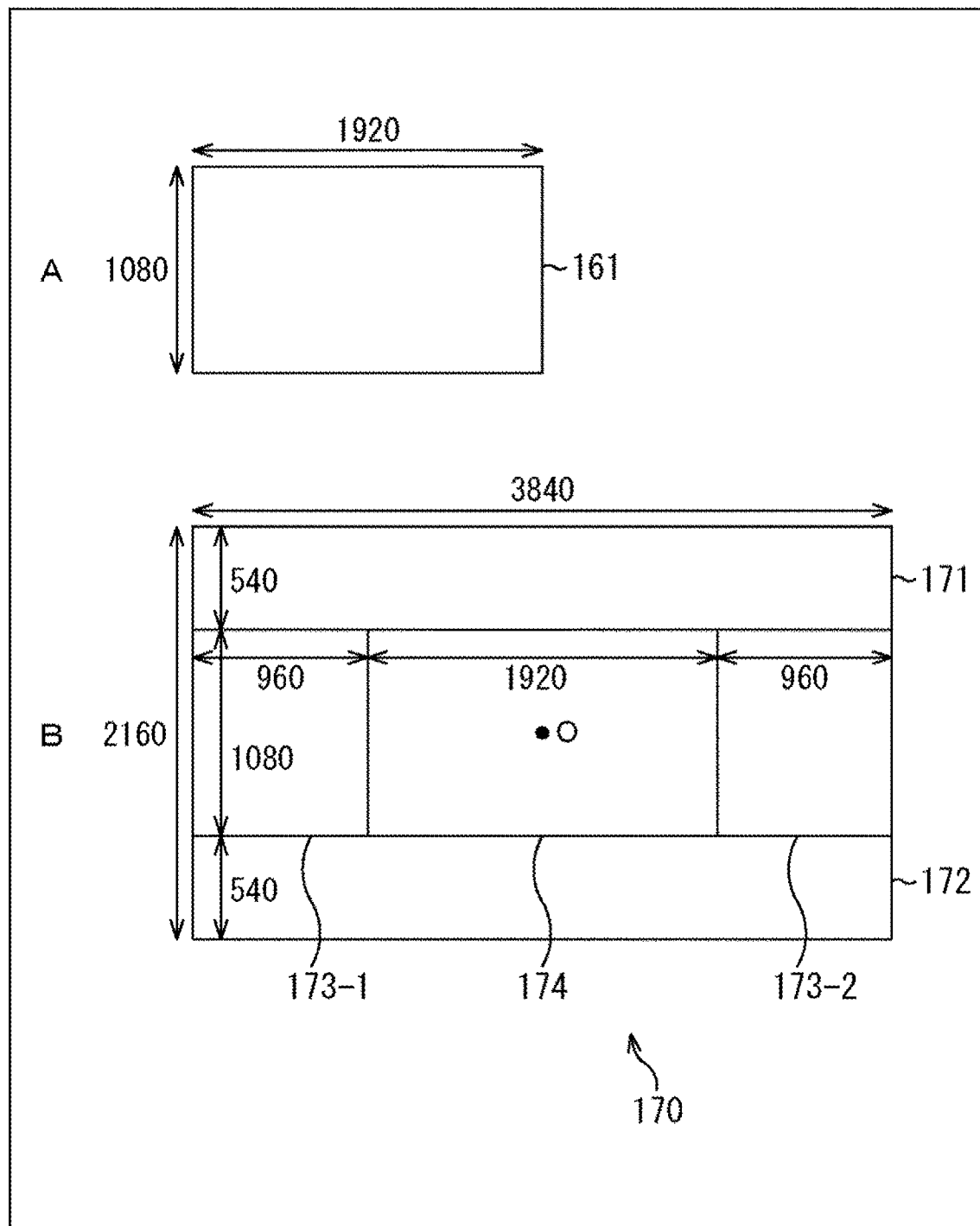
FIG. 3 is a diagram illustrative of an encoded stream of an entire celestial sphere image.

FIG. 3 is a diagram illustrative of an encoded stream of an entire celestial sphere linage.

If the resolution of an entire celestial sphere image 170 is 4 k (3840 pixels×2160 pixels), as depicted in FIG. 3, then the horizontal resolution of a low-resolution entire celestial sphere image 161 is 1920 pixels that is one-half of the horizontal resolution of the entire celestial sphere image 170, and the vertical resolution of the low-resolution entire celestial sphere image 161 is 1080 pixels that is one-half of the vertical resolution of the entire celestial sphere image 170, as depicted in FIG. 3 at A. The low-resolution entire celestial sphere image 161 is encoded as it is, generating a single low-resolution encoded stream.

As depicted in FIG. 3 at B, the entire celestial sphere image 170 is divided vertically into three regions, and the central region thereof is divided horizontally into three regions such that no boundary lies at the center O. As a result, the entire celestial sphere image 170 is divided into an upper image 171 as the upper region of 3840 pixels×540 pixels, a lower image 172 as the lower region of 3840 pixels×540 pixels, and the central region of 3840 pixels× 1080 pixels. The central region of 3840 pixels×1080 pixels is divided into a left end image 173-1 as the left region of 960 pixels×1080 pixels, a right end image 173-2 as the right region of 960 pixels×1080 pixels, and a central image 174 as the central region of 1920 pixels×1080 pixels.

The upper image 171 and the lower image 172 have their horizontal resolution reduced to one-half, generating a low-resolution upper image and a low-resolution lower image. Since the entire celestial sphere image is an image that spreads horizontally and vertically through 360 degrees, the left end image 173-1 and the right end image 173-2 that face each other are actually continuous images. The left end of the left end image 173-1 is combined with the right end of the right end image 173-2, generating an end image. The low-resolution upper image, the low-resolution lower image, the end image, and the central image 174 are encoded independently of each other, generating four high-resolution encoded streams.

Generally, the entire celestial sphere image 170 is generated such that the front of the entire celestial sphere image 170 at a position on the entire celestial sphere image 170 that is located at the center of the field of view in the standard direction of sight lies at the center O of the entire celestial sphere image 170.

According to an encoding process such as AVC, HEVC, or the like where information is compressed by temporal motion compensation, when a subject moves on a screen, the appearance of a compression distortion is propagated between frames while being kept in a certain shape. However, if a screen is divided and the divided images are encoded independently of each other, then since motion compensation is not carried out across boundaries, a compression distortion tends to increase. As a result, a moving image made up of decoded divided images has a stripe generated therein where the appearance of a compression distortion varies at the boundaries between the divided images. This phenomenon is known to occur between slices of AVC or tiles of HEVC. Therefore, image quality is likely to deteriorate at the boundaries between the low-resolution upper image, the low-resolution lower image, the end image, and the central image 174 that have been decoded.

Consequently, the entire celestial sphere image 170 is divided such that no boundary lies at the center O of the entire celestial sphere image 170 which it is highly possible for the user to see. As a result, image quality does not deteriorate at the center O which it is highly possible for the user to see, making any image quality deterioration unobtrusive in the entire celestial sphere image 170 that has been decoded.

The left end image 173-1 and the right end image 173-2 are combined with each other and encoded. Therefore, if the areas of the end images and the central image 174 are the same, then a maximum of high-resolution encoded streams of an entire celestial sphere image from a given viewpoint which are required to display the entire celestial sphere image are two high-resolution encoded streams of either one of the low-resolution upper image and the low-resolution lower image and either one of the end image and the central image 174, independently of the viewpoint. Therefore, the number of high-resolution streams to be decoded by the moving-image playback terminal 14 is the same independently of the viewpoint.

Description of the Definition of an SRD in the First Embodiment

FIG. 4 is a diagram illustrative of an example of definition of an SRD in the first embodiment.

An SRD refers to information that can be described in an MPD file, and represents information indicating the position on a screen of one or more individually encoded regions into which an image of a moving-image content has been divided.

Specifically, an SRD is given as <SupplementalProperty schemeIdUri="urn:mpeg:dash:srd:2015" value= "source_id, object_x, object_y, object_width, object_height, total_width, total_height, spatial_set_id"/>.

"source_id" refers to the ID (identifier) of a moving-image content corresponding to the SRD. "object_z" and "object_y" refer respectively to the horizontal and vertical coordinates on a screen of an upper left corner of a region, corresponding to the SRD. "object_width" and "object_height" refer respectively to the horizontal and vertical sizes of the region corresponding to the SRD. "total_width" and "total_height" refer respectively to the horizontal and vertical sizes of a screen where the region corresponding to the SRD is placed.
"spatial_set_id" refers to the ID of the screen where the region corresponding to she SRD is placed.

As depicted in FIG. 4, according to the definition of SRD in the present embodiment, if an image of a moving-image content is a panoramic image (panorama image) or an entire celestial sphere image (celestial sphere dynamic), then the sum of "object_z" and "object_width" may exceed "total_width," and the sum of "object_y" and "object_height" may exceed "total_height."

Information indicating that an usage of a moving-image content is a panoramic image (panorama image) or an entire celestial sphere image (celestial sphere dynamic) may be described in an MPD file. In this case, the definition of SRD in the present embodiment is depicted in FIG. 5.

Description of an SBD of an End Image

Figure 6:
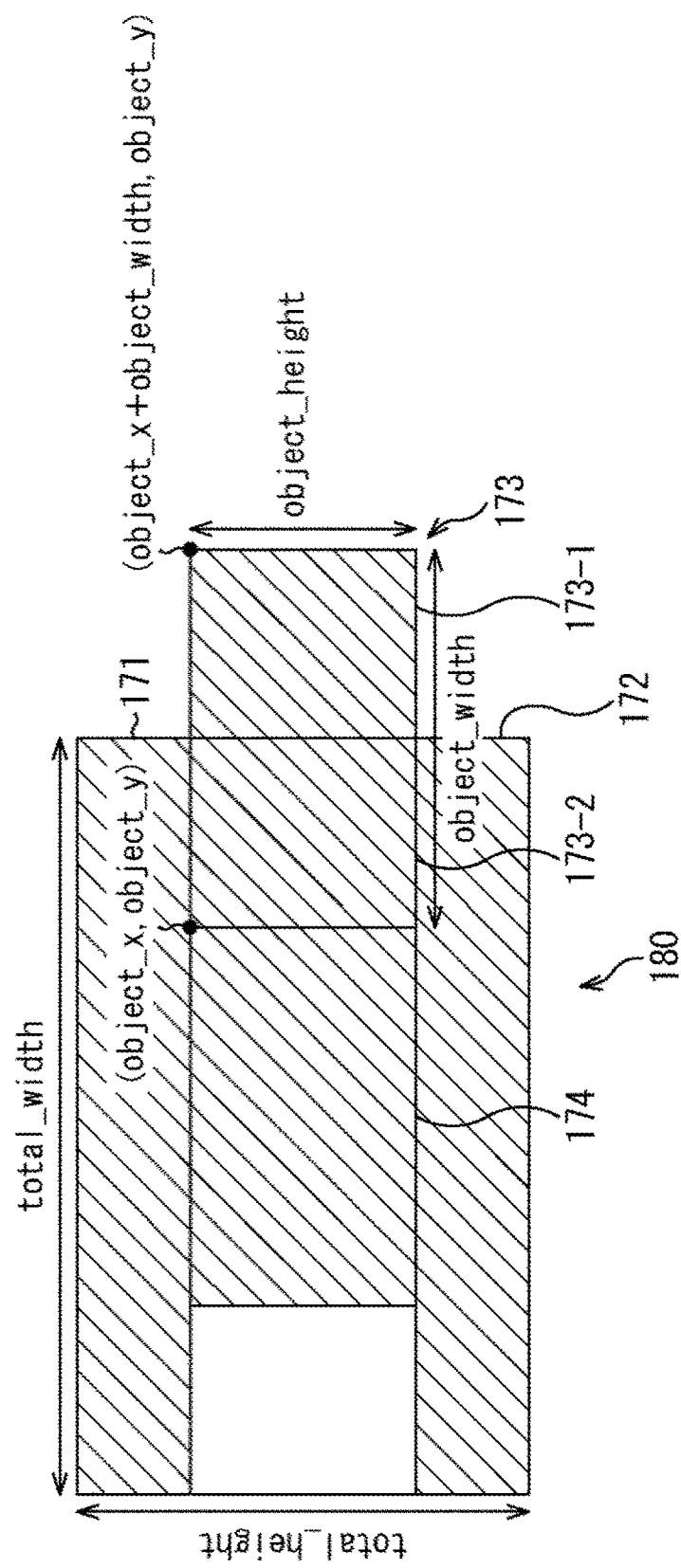
FIG. 6 is a diagram depicting an SRD of an end image described in an MPD (Media Presentation Description; file.

FIG. 6 is a diagram depicting an SRD of an end image described in an MPD file.

As described above with reference to FIG. 4, according to the SRD in the first embodiment, if an image of a moving-image content is an entire celestial sphere image, then the sum of "object_x" and "object_width" may exceed "total_width."

Therefore, the file generating apparatus 11 sets the position of the left end image 173-1 on a screen 180 to the right side of the right end image 173-2, for example. As depicted in FIG. 6, the position of the left end image 173-1 on the screen 180 now protrudes oat of the screen 180. However, the positions on the screen 180 of the right end image 173-2 and the left end image 173-1 that make up the end image 173 are rendered contiguous. Consequently, the file generating apparatus 11 can describe the position of the end image 173 on the screen 180 with an SRD.

Specifically, the file generating apparatus 11 describes the horizontal and vertical coordinates of the position on the screen 180 of an upper left corner of the right end image 173-2 as "object_x" and "object_y" of the SRD of the end image 173, respectively. The file generating apparatus 11 also describes the horizontal and vertical sizes of the end image 173 as "object_width" and "object_height" of the SRD of the end image 173, respectively.

The file generating apparatus 11 also describes the horizontal and vertical sizes of the screen 180 as "total_width" and "total_height" of the SRD of the end image 173, respectively. The file generating apparatus 11 thus sets the position protruding out of the screen 180 as the position of the end image 173 on the screen 180.

By contrast, if the definition of an SRD is limited such that the sum of "object_x" and "object_width" is equal to or smaller than "total_width" and the sum of "object_y" and "object_height" is equal to or smaller than "total_height," as depicted in FIG. 7, i.e., if the position on the screen of the region corresponding to the SRD is inhibited from protruding out of the screen, then the position of the left end image 173-1 on the screen 180 cannot be set to the right side of the right end image 173-2.

Therefore, the positions on the screen 180 of the right end image 173-2 and the left end image 173-1 that make up the end image 173 are not contiguous, and the positions on the screen 180 of both the right end image 173-2 and the left end image 173-1 need to be described as the position of the end image 173 on the screen 180. As a consequence, the positron of the end image 173 on the screen 180 cannot be described by an SRD.

Example of an MPD File

FIG. 8 is a diagram illustrative of an example of an MPD file generated by the file generating apparatus 11 depicted in FIG. 1.

As depicted in FIG. 8, in the MPD file, "AdaptationSet" is described per encoded stream. Each "AdaptationSet" has the SRD of the corresponding region described therein and "Representation" described therein. "Representation" has information, such as the URL (Uniform Resource Locator) of the image file of the corresponding encoded stream, described therein.

Specifically, the first "AdaptationSet" in FIG. 8 is the "AdaptationSet" of a low-resolution encoded stream of the low-resolution entire celestial sphere image 161 of the entire celestial sphere image 170. Therefore, the first "AdaptationSet" has <SupplementalProperty schemeIdUri="urn:mpeg:dash:srd:2014" value="1,0,0,1920,1080,1920,1080,1"/> that represents the SRD of the low-resolution entire celestial sphere image 161 described therein. The "Representation"

of the first "AdaptationSet" has the URL "stream1.mp4" of the image file of the low-resolution encoded stream described therein.

The second "AdaptationSet" in FIG. 8 is the "AdaptationSet" of a high-resolution encoded stream of the low-resolution upper image of the entire celestial sphere image 170. Therefore, the second "AdaptationSet" has <SupplementalProperty schemeIdUri="urn:mpeg:dash:srd:2014" value="1,0,0,3840,540,3840,2160,2"/> that represents the SRD of the low-resolution upper image described therein. The "Representation" of the second "AdaptationSet" has the URL "stream2.mp4" of the image file of the high-resolution encoded stream of the low-resolution upper image described therein.

The third "AdaptationSet" in FIG. 8 is the "AdaptationSet" of a high-resolution encoded stream of the central image 174 of the entire celestial sphere image 170. Therefore, she third "AdaptationSet" has <SupplementalProperty schemeIdUri="urn:mpeg:dash:srd:2014" value="1,960,540,1920,1080,3840,2160,2"/> that represents the SRD of the central image 174 described therein. The "Representation" of the third "AdaptationSet" has the URL "stream3.mp4" of the image file of the high-resolution encoded stream of the central image 174 described therein.

The fourth "AdaptationSet" in FIG. 8 as the "AdaptationSet" of a high-resolution encoded stream of the low-resolution lower image of the entire celestial sphere image 170. Therefore, the fourth "AdaptationSet" has <SupplementalProperty schemeIdUri="urn:mpeg:dash:srd:2014" value="1,0,1620,3840,540,3840,2160,2"/> that represents the SRD of the low-resolution lower image described therein. The "Representation" of the fourth "AdaptationSet" has the URL "stream4.mp4" of the image file of the high-resolution encoded stream of the low-resolution lower image described therein.

The fifth "AdaptationSet" in FIG. 8 is the "AdaptationSet" of a high-resolution encoded stream of the end image 173 of she entire celestial sphere image 170. Therefore, the fifth "AdaptationSet" has <SupplementalProperty schemeIdUri="urn:mpeg:dash:srd:2014" value="1,2880,540,1920,1080,3840,2160,2"/> that represents the SRD of the end image 173, described therein. The "Representation" of the fifth "AdaptationSet" has the URL "stream5.mp4" of the image file of the high-resolution encoded stream of the end image 173 described therein.

Description of a Process of the Image File Generator

Figure 9:
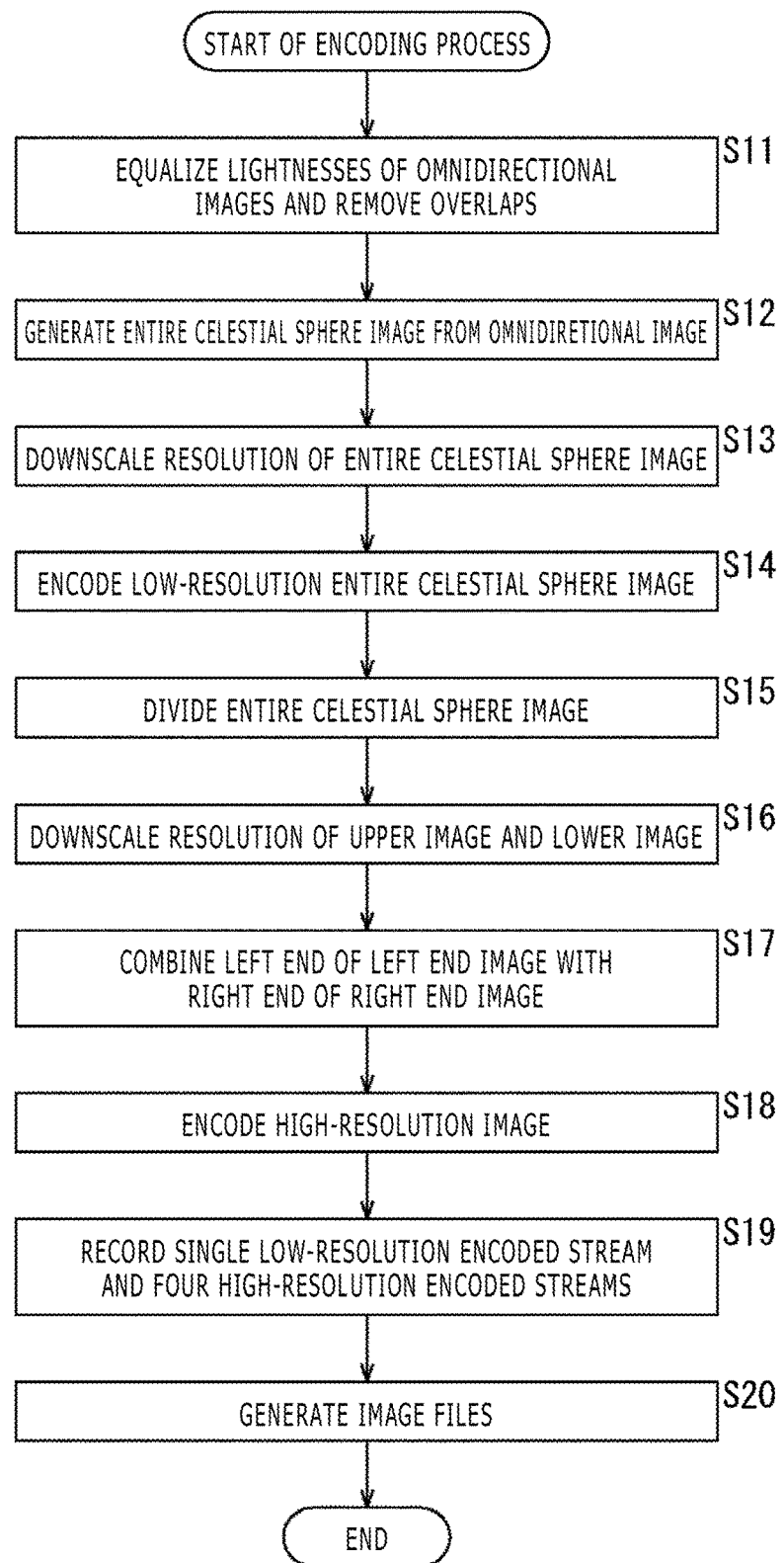
FIG. 9 is a flowchart of an encoding process of the image file generator depicted in FIG. 2.

FIG. 9 is a flowchart of an encoding process of the image file generator 150 depicted in FIG. 2.

In step S11 depicted in FIG. 9, the stitching processor 151 equalizes the colors and lightnesses of omnidirectional images supplied from the multi-cameras, not depicted, and join them while removing overlaps. The stitching processor 151 supplies an omnidirectional image obtained as a result to the mapping processor 152.

In step S12, the mapping processor 152 generates an entire celestial sphere image 170 from the omnidirectional image supplied from the stitching processor 151, and supplies the entire celestial sphere image 170 to the resolution downscaler 153 and the divider 155.

In step S13, the resolution downscaler 153 downscales the resolution of the entire celestial sphere image 170 supplied from the mapping processor 152, generating a low-resolution entire celestial sphere image 161. Tins resolution downscaler 153 supplies the low-resolution entire celestial sphere image 161 to the encoder 154.

In step S14, the encoder 154 encodes the low-resolution entire celestial sphere image 161 supplied from the resolution downscaler 153, thereby generating a low-resolution encoded stream. The encoder 154 supplies the low-resolution encoded stream to the storage 157.

In step S15, the divider 155 divides the entire celestial sphere image 170 supplied from the mapping processor 152 into an upper image 171, a lower image 172, a left end image 173-1, a right end image 173-2, and a central image 174. The divider 155 supplies the central image 174 to the encoder 156-4.

In step S16, the divider 155 downscales the resolution of the upper image 171 and the lower image 172 such that their horizontal resolution is reduced to one-half. The divider 155 supplies a low-resolution upper image obtained as a result to the encoder 156-1 and also supplies a low-resolution lower image, which represents the lower region whose resolution has been downscaled, to the encoder 156-2.

In step S17, the divider 155 combines the left end of the left end image 173-1 with the right end of the right end image 173-2, thereby generating an end image 173. The divider 155 supplies the end image 173 to the encoder 156-3.

In step S18, the encoders 156-1 through 156-4 encode the low-resolution upper image, the low resolution lower image, the end image 173, and the central image 174, respectively, supplied from the divider 155. The encoders 156-1 through 156-4 supply encoded streams generated as a result as high-resolution streams to the storage 157.

In step S19, the storage 157 records therein the single low-resolution encoded stream supplied from the encoder 154 and the four high-resolution encoded streams supplied from the encoders 156-1 through 156-4.

In step 520, the generator 158 reads the single low-resolution encoded stream and the four high-resolution encoded streams from the storage 157, and converts each of them into files each per segment, thereby generating image files. The generator 158 transmits the image files to the Web server 12 depicted in FIG. 1. The encoding process is now ended.

Functional Configurational Example of a Moving-Image Playback Terminal

Figure 10:
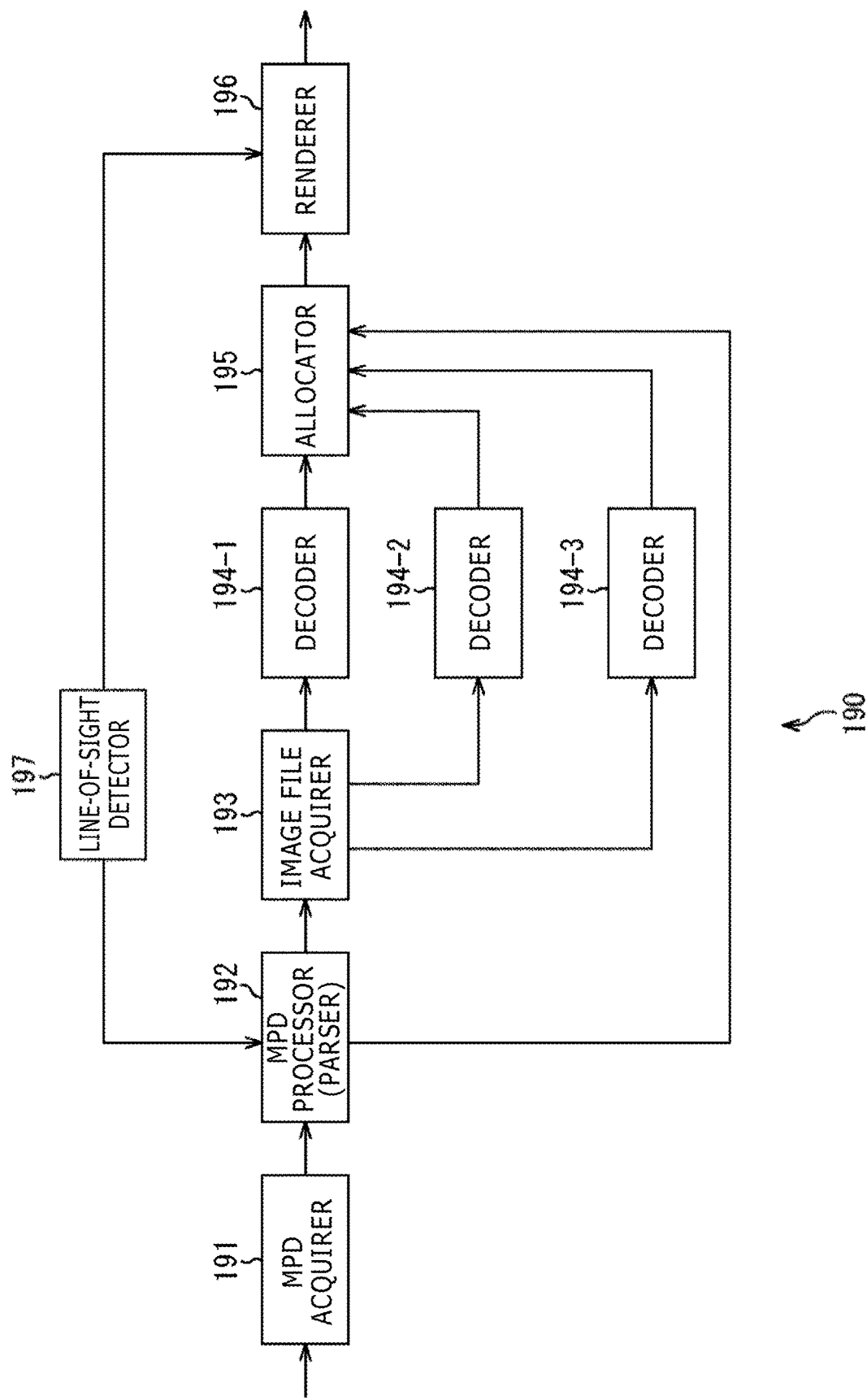
FIG. 10 is a block diagram depicting a configurational example of a streaming player implemented by a moving-image playback terminal depicted in FIG. 1.

FIG. 10 is a block diagram depicting a configurational example of a streaming player that is implemented by the moving-image playback terminal 14 depicted in FIG. 1 when it executes the control software 21, the moving-image playback software 22, and the access software 23.

The streaming player 190 depicted in FIG. 10 includes an MPD acquirer 191, an MPD processor 192, an image file acquirer 193, decoders 194-1 through 194-3, an allocator 195, a renderer 196, and a line-of-sight detector 197.

The MPD acquirer 191 of the streaming player 190 acquires an MPD file from the Web server 12, and supplies the MPD file to the MPD processor 192.

Based on the direction of sight of the user supplied from the line-of-sight detector 197, the MPD processor 192 selects two of the upper image 171, the lower image 172, the end image 173, and the central image 174 as selected images that may possibly be included in the field of view of the user. Specifically, when the entire celestial sphere image 170 is mapped onto a spherical plane, the MPD processor 192 selects one of the upper image 171 and the lower image 172 and one of the end image 173 and the central image 174 which may be possibly included in the field of view of the user when the user that exists within the sphere looks along the direction of sight, as selected images.

The MPD processor 192 extracts information such as URLs of the image files of the low-resolution entire celestial sphere image 161 and the selected images in the segments to be played, from the MPD file supplied from the MPD acquirer 191, and supplies the extracted information to the image file acquirer 193. The MPD processor 192 also extracts the SRDs of the low-resolution entire celestial sphere image 161 and the selected images in the segments to be played, from the MPD file, and supplies the extracted SRDs to the allocator 195.

The image file acquirer 193 requests the Web server 12 for the encoded streams or the image files that are specified by the URLs supplied from the MPD processor 192, and acquires the encoded streams. The image file acquirer 193 supplies the acquired love-resolution encoded stream to the decoder 194-1. The image file acquirer 193 also supplies the high-resolution encoded stream of one of the selected images to the decoder 194-2, and supplies the high-resolution encoded stream of the other selected image to the decoder 194-3.

The decoder 194-1 decodes the low-resolution encoded stream supplied from, the image file acquirer 193 according to a process corresponding to an encoding process such as AVC, HEVC, or the like, and supplies the low-resolution entire celestial sphere image 161 obtained as a result of the decoding process to the allocator 195.

The decoders 194-2 and 194-3 decode the high-resolution encoded streams of the selected images supplied, from the image file acquirer 193 according to a process corresponding to an encoding process such as AVC, HEVC, or the like. The decoders 194-2 and 194-3 then supply the selected images obtained as a result of the decoding process to the allocator 195.

The allocator 195 places the low-resolution entire celestial sphere image 161 supplied from the decoder 194-1 on the screen on the basis of the SRD supplied from the MPD processor 192. Thereafter, the allocator 195 superposes the selected images supplied from the decoders 194-2 and 194-3 on the screen where the low-resolution entire celestial sphere image 151 has been placed, on the basis of the SRD.

Specifically, the horizontal and vertical sizes of the screen where the low-resolution entire celestial sphere image 161 indicated by the SRD is placed are one-half of the horizontal and vertical sizes of the screen where the selected images are placed. Therefore, the allocator 195 increases twice the horizontal and vertical sizes of the screen where the low-resolution entire celestial sphere image 161 is placed, and superposes the selected images thereon. The allocator 195 maps the screen on which the selected images have been superposed onto a sphere, and supplies a spherical image obtained as a result to the renderer 196.

The renderer 196 projects the spherical image supplied from the allocator 195 onto the field of view of the user supplied from the line-of-sight detector 197, thereby generating an image in the field of view of the user. The tenderer 196 then controls a display device, not depicted, to display the generated image as a display image.

The line-of-sight detector 197 detects the direction of sight of the user. The direction of sight of the user may be detected by a detecting method based on the gradient of a device worn by the user, for example. The line-of-sight detector 197 supplies the detected direction of sight of the user to the MPD processor 192.

The line-of-sight detector 197 also detects the position of the user. The position of the user may be detected by a detecting method, based on a captured image of a marker or the like that is added to a device worn by the user, for example. The line-of-sight detector 197 determines a field of view of the user based on the detected position of the user and the line-of-sight vector, and supplies the determined field, of view of the user to the tenderer 196.

Description of a Process of the Moving-Image Playback Terminal

Figure 11:
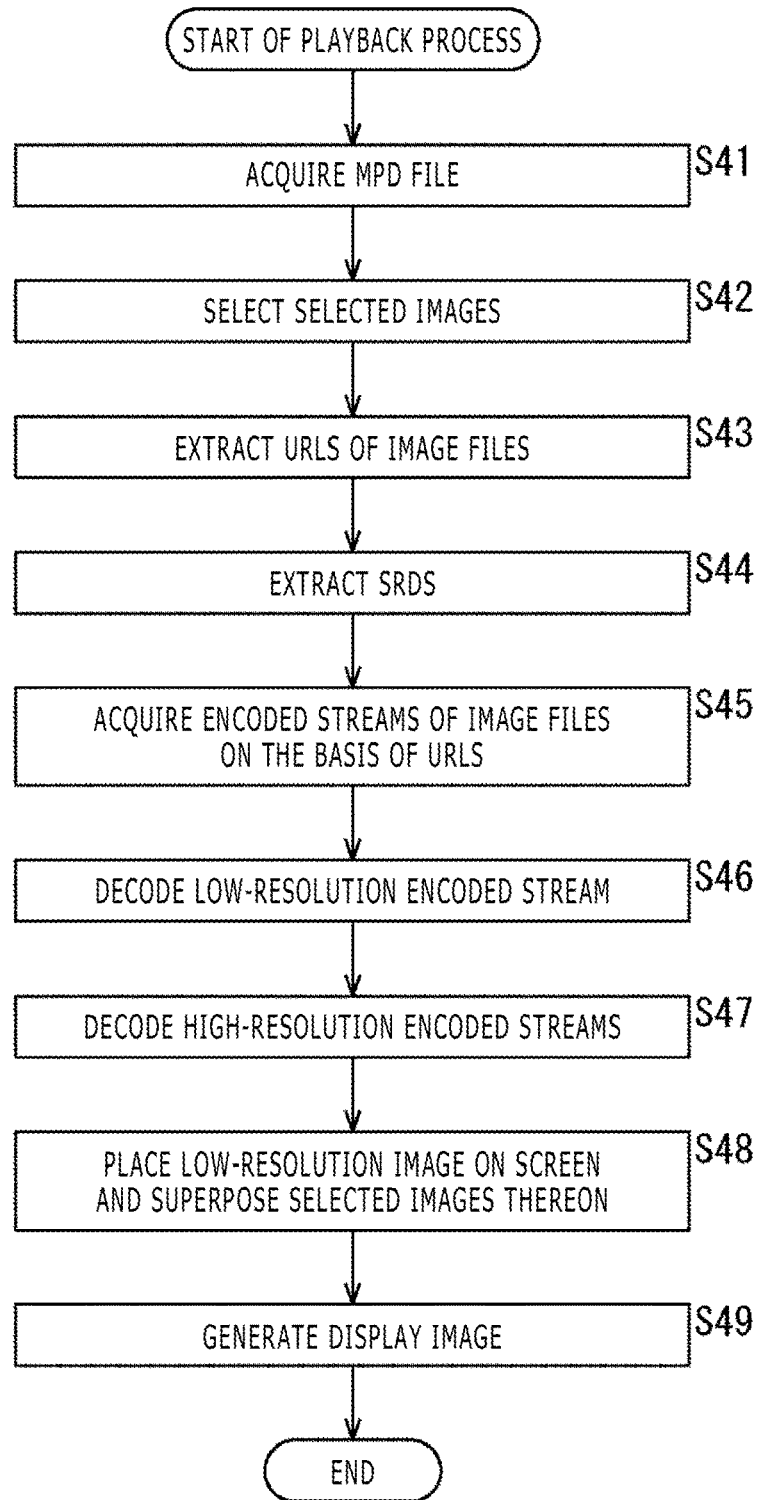
FIG. 11 is a flowchart of a playback process of the streaming player depicted in FIG. 10.

FIG. 11 is a flowchart of a playback process of the streaming player 190 depicted in FIG. 10.

In step S41 depicted in FIG. 11, the MPD acquirer 191 of the streaming player 190 acquires the MPD file from the Web server 12 and supplies the acquired MPD file to the MPD processor 192.

In step S42, the MPD processor 192 selects two of the upper image 171, the lower image 172, the end image 173, and the central image 174 as selected images that may possibly be included in the field of view of the user, on the basis of the direction of sight of the user supplied from the line-of-sight detector 197.

In step S43, the MPD processor 192 extracts information such as URLs of the image flies of the low-resolution entire celestial sphere image 161 and the selected images in the segments to be played, from the MPD file supplied from the MPD acquirer 191, and supplies the extracted information to the image file acquirer 193. In step S44, the MPD processor 192 extracts the SRDs of the low-resolution entire celestial sphere image 161 and the selected images in the segments to be played, from the MPD file, and supplies the extracted SRDs to the allocator 195.

In step S45, the image file acquirer 193 requests the Web server 12 for the encoded streams of the image files that are specified by the URLs supplied from the MPD processor 192, and acquires the encoded streams. The image file acquirer 193 supplies the acquired low-resolution encoded stream to the decoder 194-1. The image file acquirer 193 also supplies the high-resolution encoded stream of one of the selected images to the decode 194-2, and supplies the high-resolution encoded stream of the other selected image to the decoder 194-3.

In step S46, the decoder 194-1 decodes the low-resolution encoded stream supplied from the image file acquirer 193, and supplies the low-resolution entire celestial sphere image 161 obtained as a result of the decoding process to the allocator 195.

In step S47, the decoders 194-2 and 194-3 decode the high-resolution encoded streams of the selected images supplied from the image file acquirer 193, and supplies the selected images obtained as a result of the decoding process to the allocator 195.

In step S48, the allocator 195 places the low-resolution entire celestial sphere image 151 supplied from the decoder 194-1 on the screen on the basis of the SRD supplied from the MPD processor 192. Thereafter, the allocator 195 superposes the selected images supplied from the decoders 194-2 and 194-3 on the screen. The allocator 195 maps the screen on which the selected images have bees superposed onto a sphere, and supplies a spherical image obtained as a result to the renderer 196.

In step S49, the renderer 196 projects the spherical image supplied from the allocator 195 onto the field of view of the user supplied from the line-of-sight detector 197, thereby generating an image to be displayed. The renderer 196 then controls the display device, not depicted, to display the generated image as a display image. The playback process is now ended.

Second Embodiments

Example of the Segment Structure of the Image File of an End Image

According to a second embodiment of the image processing system to which the present disclosure is applied, different levels (to be described in detail later) are set for the encoded stream of the left end image 173-1 and the encoded stream of the right end image 173-2, among the encoded streams of the end image 173. As a consequence, if an SRD is defined as depicted in FIG. 7, then the positions of the left end image 173-1 and the right end image 173-2 on the screen 180 can be described using the SRD.

Specifically, the second embodiment of the image processing system to which the present disclosure is applied is the same as the first, embodiment except the segment structure of the image file of the end image 173 generated, by the file generating apparatus 11 and the MPD file. Therefore, only the segment structure of the image file of the end image 173 and the MPD file will be described below.

Figure 12:
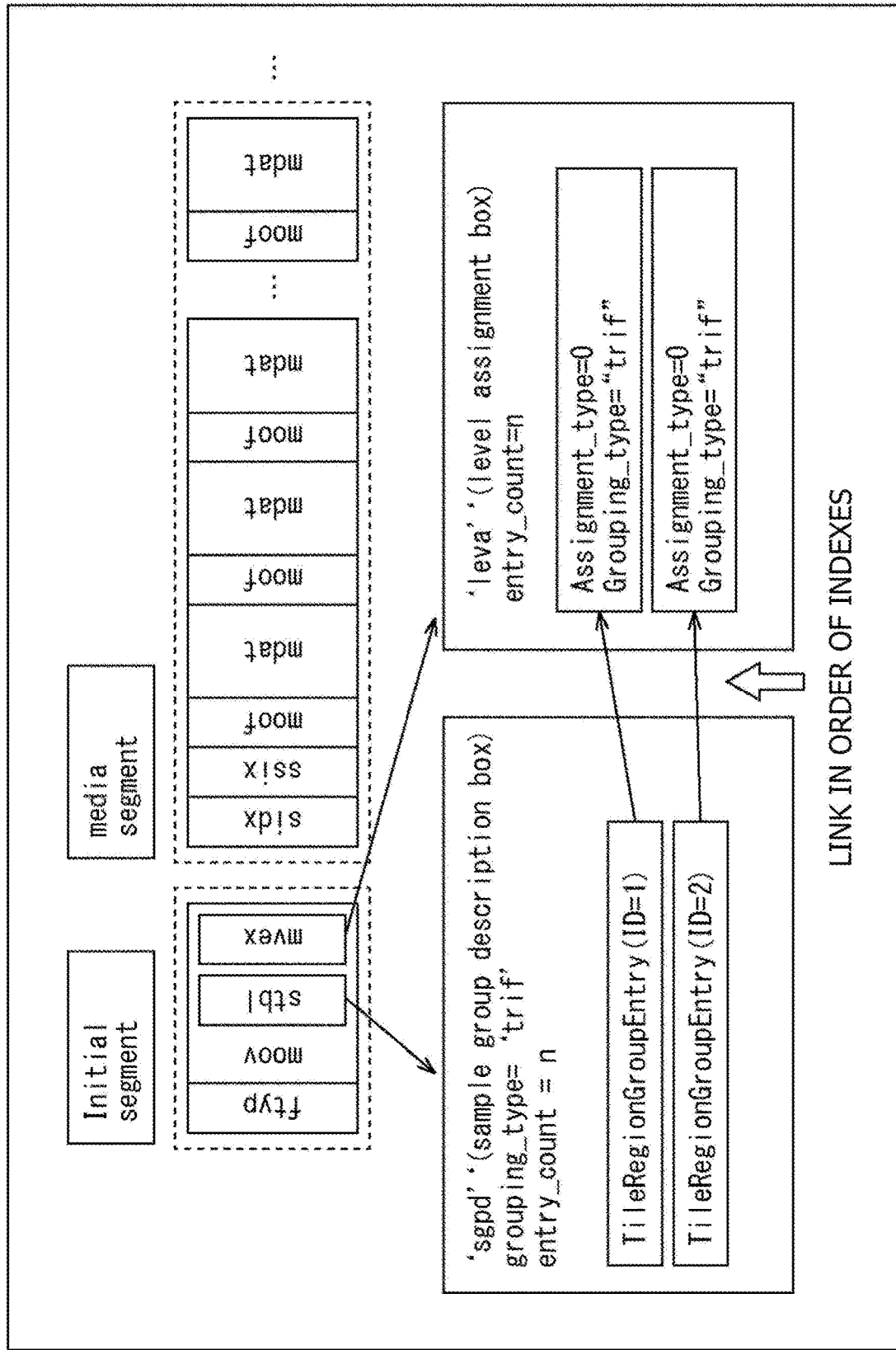
FIG. 12 is a diagram depicting an example of the segment structure of an image file of an end image in a second embodiment of the information processing system to which the present disclosure is applied.

FIG. 12 is a diagram depicting an example of the segment structure of the image file of the end image 173 in the second embodiment of the information processing system to which the present disclosure is applied.

As depicted in FIG. 12, in the image file of the end image 173, an Initial segment includes an ftyp box and an moov box. The moov box includes an stbl box and an mvex box placed therein.

The stbl box includes an sgpd box, etc. placed therein where Tile Region Group Entry indicating the position of the left end image 173-1 as part of the end image 173 on the end image 173 and Tile Region Group Entry indicating the position of the right end image 173-2 on the end image 173 are successively described. Tile Region Group Entry is standardized by HEVC Tile Track of HEVC File Format.

The mvex box includes an leva box, etc. placed therein where 1 is set as the level for the left end image 173-1 corresponding to the first Tile Region Group Entry and 2 is set as the level for the right end image 173-2 corresponding to the second Tile Region Group Entry.

The leva box sets 1 as the level for the left end image 173-1 and 2 as the level for the right end image 173-2 by successively describing information of the level corresponding to the first Tile Region Group Entry and information of the level corresponding to the second Tile Region Group Entry. The level functions as an index when part of an encoded stream is designated from an MPD file.

The leva box has assignment_type described therein that indicates whether the object for which a level is to be set is an encoded stream placed on a plurality of tracks or not as information of each level. In the example depicted in FIG. 12, the encoded stream of the end image 173 is placed on one track. Therefore, the assignment_type is set to 0 indicating that the object for which a level is to be set is not an encoded stream placed on a plurality of tracks.

The leva box also has the type of Tile Region Group Entry corresponding to the level described therein as information of each level. In the example depicted in FIG. 12, "trif" representing the type of Tile Region Group Entry described in the sgpd box is described as information of each level.

Details of the leva box are described in ISO/IEC 14496-12 ISO base media file format 4th edition, July 2012, for example.

A media segment includes one or more subsegments including an sidx box, an ssix box, and pairs of moof and mdat boxes. The sidx box has positional information placed therein which indicates the position of each subsequent in the image file. The ssix box includes positional information of the encoded streams of respective levels placed in the mdat boxes.

A subsegment is provided per desired time length. The mdat boxes have encoded streams placed together therein for a desired time length, and the moof boxes have management information of those encoded streams placed therein.

Example of Tile Region Group Entry

Figure 13:
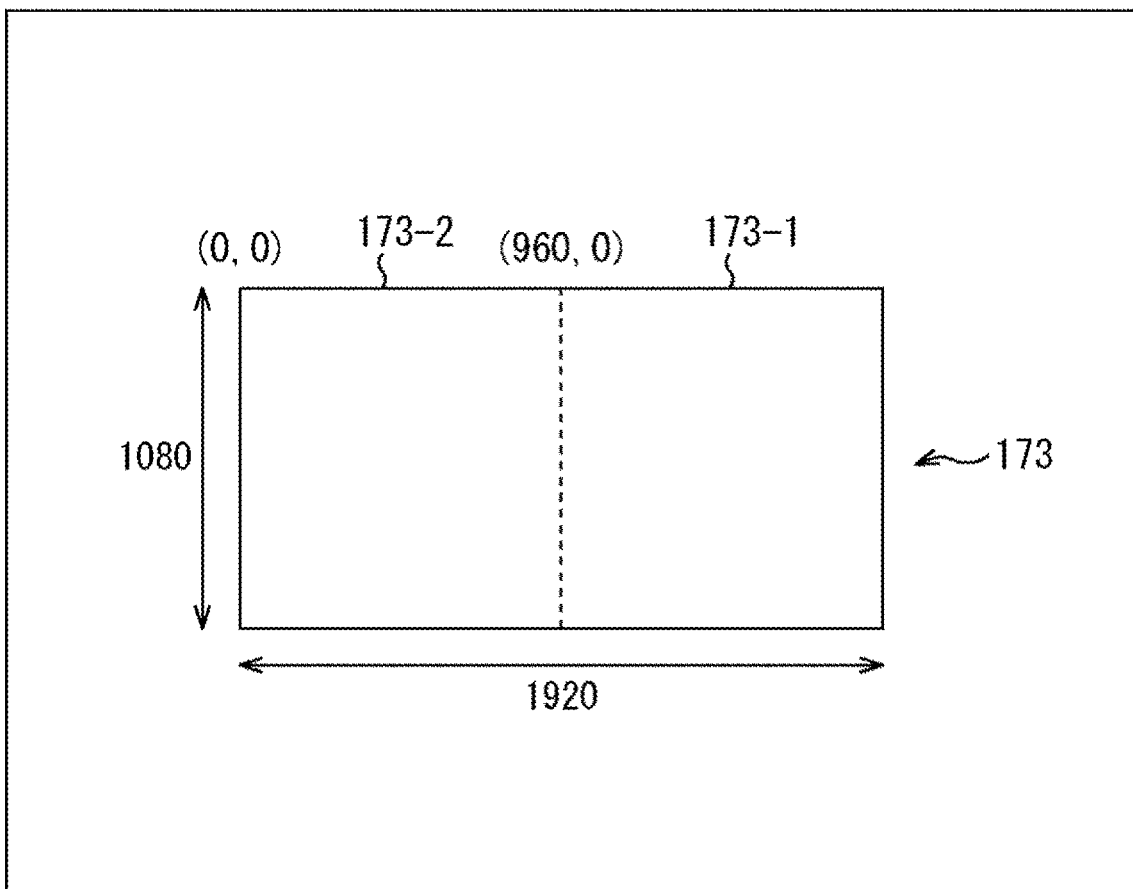
FIG. 13 is a diagram depicting an example of Tile Region Group Entry in FIG. 12.

FIG. 13 is a diagram depicting an example of Tile Region Group Entry in FIG. 12.

Tile Region Group Entry describes successively therein the ID of the Tile Region Group Entry, horizontal and vertical coordinates of an upper left corner of the corresponding region on an image corresponding to the encoded stream, and horizontal and vertical sizes of the image corresponding to the encoded stream.

As depicted in FIG. 13, the end image 173 is made up of the right end image 173-2 of 960 pixels×1080 pixels and the left end image 173-1 of 960 pixels×1080 pixels whose left end is combined with the right end of the right end image 173-2. Therefore, the Tile Region Group Entry of the left end image 173-1 is represented by (1,960,0,960,1080), and the Tile Region Group Entry of the right end image 173-2 is represented by (2,0,0,960,1080).

Example of an MPD File

FIG. 14 is a diagram depicting an example of an MPD file.

The MPD file depicted in FIG. 14 is the same as the MPD file depicted in FIG. 8 except for the fifth "AdaptationSet" which is the "AdaptationSet" of the high-resolution encoded stream of the end image 173. Therefore, only the fifth "AdaptationSet" will be described below.

The fifth "AdaptationSet" depicted in FIG. 14 does not have the SRD of the end image 173 described therein, but has "Representation" described therein. The "Representation" has the URL "stream5.mp4" of the image file of the high-resolution encoded stream of the end image 173 described therein. Since a level is set for the encoded stream of the end image 173, "SubRepresentation" per level can be described in the "Representation."

Therefore, the "SubRepresentation" of level "1" has <SupplementalProperty schemeIdUri="urn:mpeg:dash:srd:2014" value="1,2880,540,960,1080,3840,2160,2"/> which represents the SRD of the left end image 173-1 described therein. The SRD of the left end image 173-1 is thus set in association with the position on the end image 173 of the left end image 173-1 indicated by the Tile Region Group Entry corresponding to level "1."

The "SubRepresentation" of level "2" has <SupplementalProperty schemeIdUri="urn:mpeg:dash:srd:2014" value="1,0, 540, 960, 1080, 3340, 2160, 2"/> which represents the SRD of the right end image 173-2 described therein. The SRD of the right end image 173-2 is thus set in association with the position on the end image 173 of the right end image 173-2 indicated by the Tile Region Group Entry corresponding to level "2."

According to the second embodiment, as described above, different levels are set for the left end image 173-1 and the right end image 173-2. Therefore, positions on the screen 180 of the left end image 173-1 and the right end image 173-2 that make up the end image 173 corresponding to the encoded stream can be described by the SRD.

The streaming player 190 places the left end image 173-1 in she position indicated by the Tile Region Group Entry corresponding to level "1" of the decoded end image 173, on the screen 180 on the basis of the SRD of level "1" set in the MPD file. The streaming player 190 also places the right end image 173-2 in the position indicated by the Tile Region Group Entry corresponding to level "2" of the decoded end image 173, on the screen 180 on the basis of the SRD of level "2" set in the MPD file.

According to the second embodiment, the encoded stream of the end image 173 is placed on one track. However, if the left end image 173-1 and the right end image 173-2 are encoded as different tiles according to the HEVC process, then their respective slice data may be placed on different tracks.

Example of a Track Structure

Figure 15:
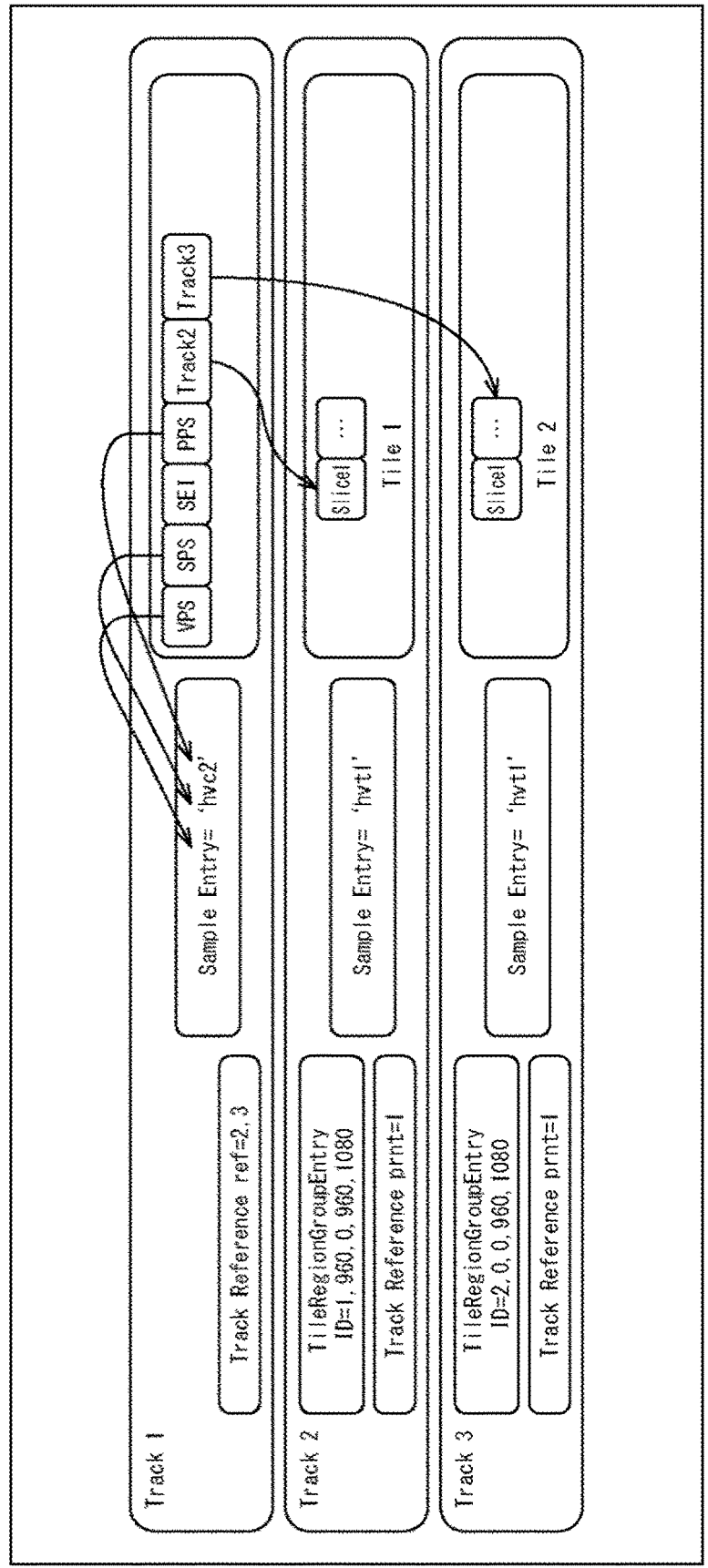
FIG. 15 is a diagram depicting an example of a track structure.

FIG. 15 is a diagram depicting an example of a track structure where the slice data of the left end image 173-1 and the right end image 173-2 are placed on different tracks.

If the slice data of the left end image 173-1 and the right end image 173-2 are placed on different tracks, then three tracks are placed in the image file of the end image 173, as depicted in FIG. 15.

The track box of each track has Track Reference placed therein. The Track Reference represents reference relationship of a corresponding track to another track. Specifically, the Track Reference represents an ID (hereinafter referred to as "track ID") inherent in another track to which the corresponding track has reference relationship. A sample of each track is managed by Sample Entry.

The track whose track ID is 1 is a base track that does not include the slice data of the encoded stream of the end image 173. Specifically, a sample of the base track has parameter sets placed therein which include VPS (Video Parameter Set), SPS (Sequence Parameter Set), SEI (Supplemental Enhancement Information), PPS (Picture Parameter Set), etc., of the encoded stream of the end image 173. The sample of the base track also has extractors in the unit of samples of the other tracks than the base track, placed therein, as subsamples. An extractor includes the type of the extractor and information indicating the position of the sample of the corresponding track in the file and the size thereof.

The track whose track ID is 2 is a track that includes slice data of she left end image 173-1 of the encoded stream of the end image 173, as a sample. The track whose track ID is 3 is a track that includes slice data of the right end image 173-2 of the encoded stream of the end image 173, as a sample.

Example of an Leva Box

The segment structure of the image file of the end image 173 in the case where she slice data of the left end image 173-1 and she right end image 173-2 are placed on different tracks is the same as the segment structure depicted in FIG. 12 except for the leva box. Therefore, only the leva box will be described below.

Figure 16:
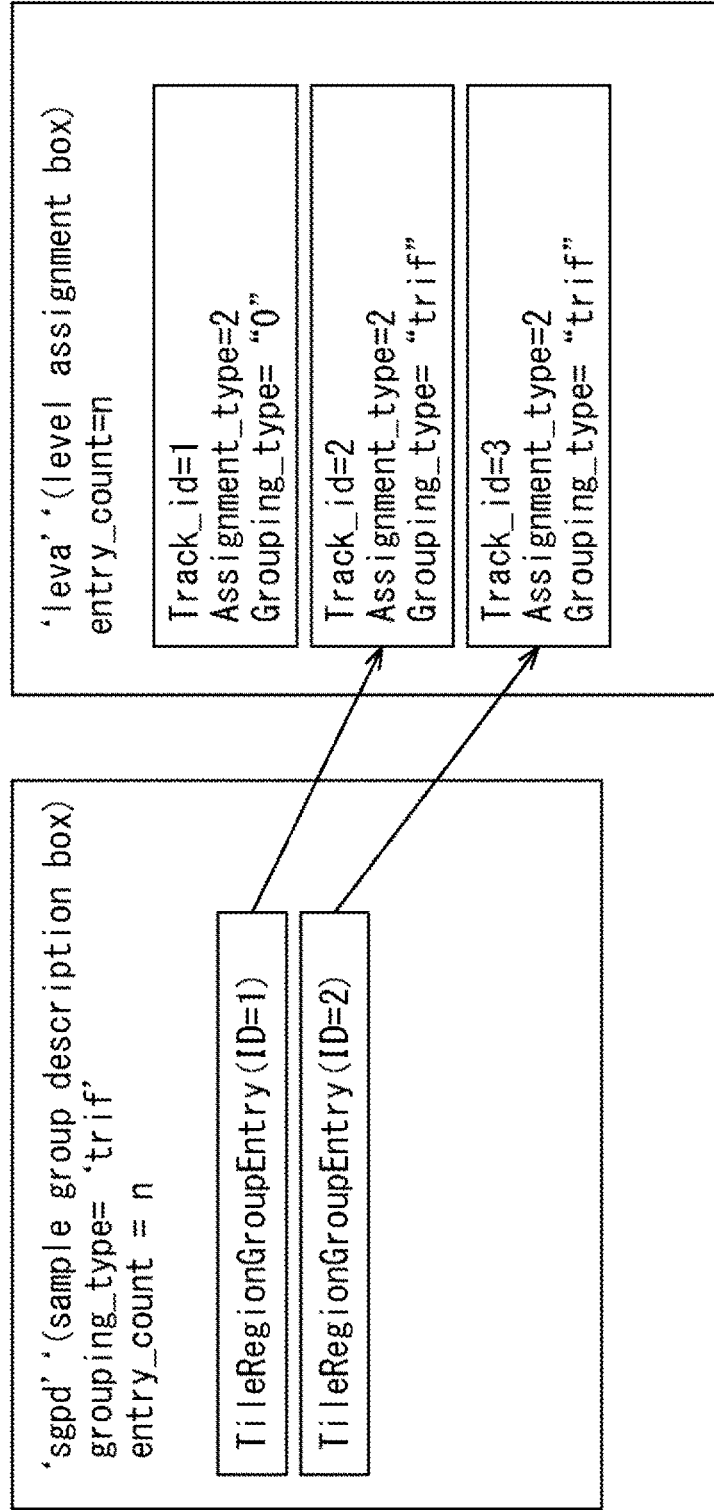
FIG. 16 is a diagram depicting another example of an leva box in the second embodiment.

FIG. 16 is a diagram depicting an example of the leva box of the image file of the end image 173 in the case where the slice data of the left end image 173-1 and the right end image 173-2 are placed on different tracks.

As depicted in FIG. 16, the leva box of the image file of the end image 173 in the case where the slice data of the left end image 173-1 and the right end image 173-2 are placed on different tracks has levels "1" through "3" successively set for the tracks having track IDs "1" through "3."

The leva box depicted in FIG. 16 has track IDs described therein for the tracks including slice data of the region in the end image 173 for which levels are set, as information of the respective levels. In the example depicted in FIG. 16, the track IDs "1," "2," and "3" are described respectively as information of levels "1," "2," and "3."

In FIG. 16, the slice data of the encoded stream of the end image 173 as an object for which levels are to be set is placed on a plurality of tracks. Therefore, the assignment_type included in the level information of each level is 2 or 3 indicating that the object for which levels are to be set is an encoded stream placed on a plurality of tracks.

In FIG. 16, furthermore, there is no Tile Region Group Entry corresponding to level "1." Therefore, the type of Tile Region Group Entry included in the information of level "1" is grouping_type "0" indicating that there is no Tile Region Group Entry. By contrast, Tile Region Group Entry corresponding to levels "2" and "3" is Tile Region Group Entry included in the sgpd box. Therefore, the type of Tile Region Group Entry included in the information of levels "2" and "3" is "trif" which is the type of Tile Region Group Entry included in the sgpd box.

Another Example of an MPD File

FIG. 17 is a diagram depicting an example of an MPD file where the slice data of the left end image 173-1 and the right end image 173-2 are placed on different tracks.

The MPD file depicted in FIG. 17 is the same as the MPD file depicted in FIG. 14 except for the elements of each "SubRepresentation" of the fifth "AdaptationSet."

Specifically, in the MPD file depicted in FIG. 17, the first "SubRepresentation" of the fifth "AdaptationSet" is "SubRepresentation" of level "2." Therefore, level "2" is described as an element of "SubRepresentation."

The track of the track ID "2" corresponding to level "2" has a dependent relationship to the base track of the track ID "1." Consequently, dependencyLevel representing the level corresponding to the track in the dependent relationship, which is described as an element of "SubRepresentation," is set to "1."

The track of the track ID "2" corresponding to level "2" is HEVC Tile Track. Therefore, codecs representing the type of encoding described as an element of "SubRepresentation" is set to "hvt1.1.2.H93.B0" that indicates HEVC Tile Track.

In the MPD file depicted in FIG. 17, the second "SubRepresentation" of the fifth "AdaptationSet" is "SubRepresentation" of level "3." Therefore, level "3" is described as an element of "SubRepresentation."

The track of the track ID "3" corresponding to level "3" has a dependent relationship to the base track of the track ID "1." Consequently, dependencyLevel described as an element of "SubRepresentation" is set to "1."

The track of the track ID "3" corresponding to level "3" is HEVC Tile Track. Therefore, codecs described as an element of "SubRepresentation" is set to "hvt1.1.2.H93.B0."

As described above, if the left end image 173-1 and the right end image 173-2 are encoded as different tiles, then the decoder 194-2 or the decoder 194-3 depicted in FIG. 10 can decode the left end image 173-1 and the right end image 173-2 independently of each other. If the slice data of the left end image 173-1 and the right end image 173-2 are placed on different tracks, then either one of the slice data of the left end image 173-1 and the right end image 173-2 can be acquired. Therefore, the MPD processor 192 can select only one of the left end image 173-1 and the right end image 173-2 as a selected image.

In the above description, the slice data of the left end image 173-1 and the right end image 173-2 that are encoded as different tiles are placed on different tracks. However, they may be placed on one track.

In the first and second embodiments, the image of the moving-image content represents an entire celestial sphere image. However, it may be a panoramic image.

Third Embodiment

Figure 18:
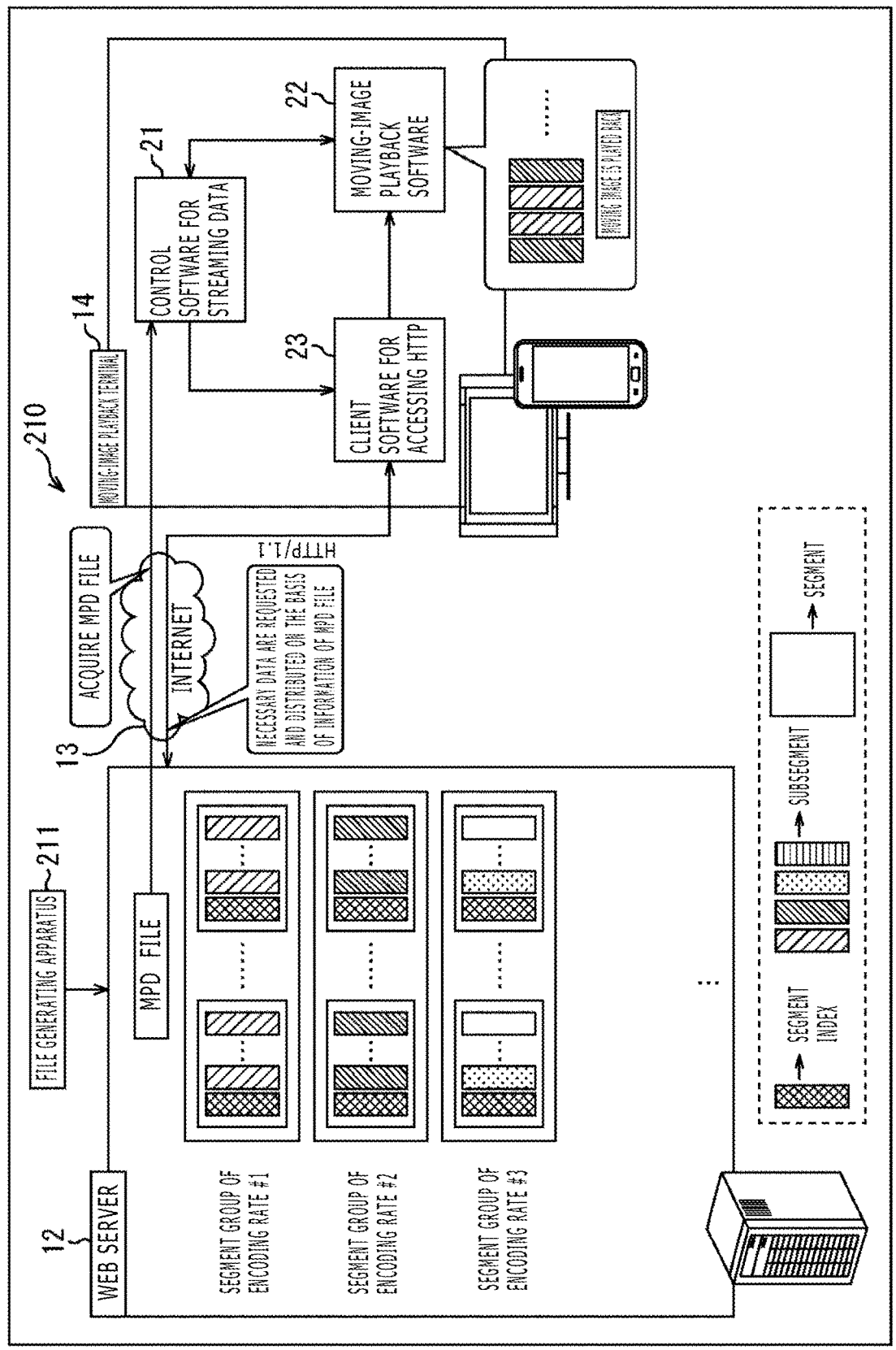
FIG. 18 is a block diagram depicting a configurational example of a third embodiment of the information processing system to which the present disclosure is applied.

Configurational Example of a Third Embodiment of the Information Processing System FIG. 18 is a block diagram depicting a configurational example of a third embodiment of an information processing system to which the present disclosure is applied.

Of the configurational details depicted in FIG. 18, those which are identical to the configurational details depicted in FIG. 1 are denoted by identical reference numerals. Redundant descriptions will be omitted as required.

The configuration of an information processing system 210 depicted FIG. 18 is different from the configuration of the information processing system 10 depicted in FIG. 1 in that a file generating apparatus 211 is provided in place of the file generating apparatus 11.

In the information processing system 210, the Web server 12 distributes encoded streams of a mosaic image as an image of a moving-image content to the moving-image playback terminal 14 according to a process equivalent to MPEG-DASH. The mosaic image refers to an image made up of thumbnail images of moving images from a plurality of broadcast programs.

The file generating apparatus 211 of the information processing system 210 encodes a mosaic image at a plurality of encoding rates (bit rates), thereby generating encoded streams. The file generating apparatus 211 generates image files by converting the encoded streams at the respective encoding rates into files each per time unit called "segment" ranging from several to 10 seconds. The file generating apparatus 211 uploads the generated image files to the Web server 12.

The file generating apparatus 211 (setting section) also generates an MPD file (management file) for managing image files, etc. The file generating apparatus 211 uploads the MPD file to the Web server 12.

Configurational Example of a File Generating Apparatus

Figure 19:
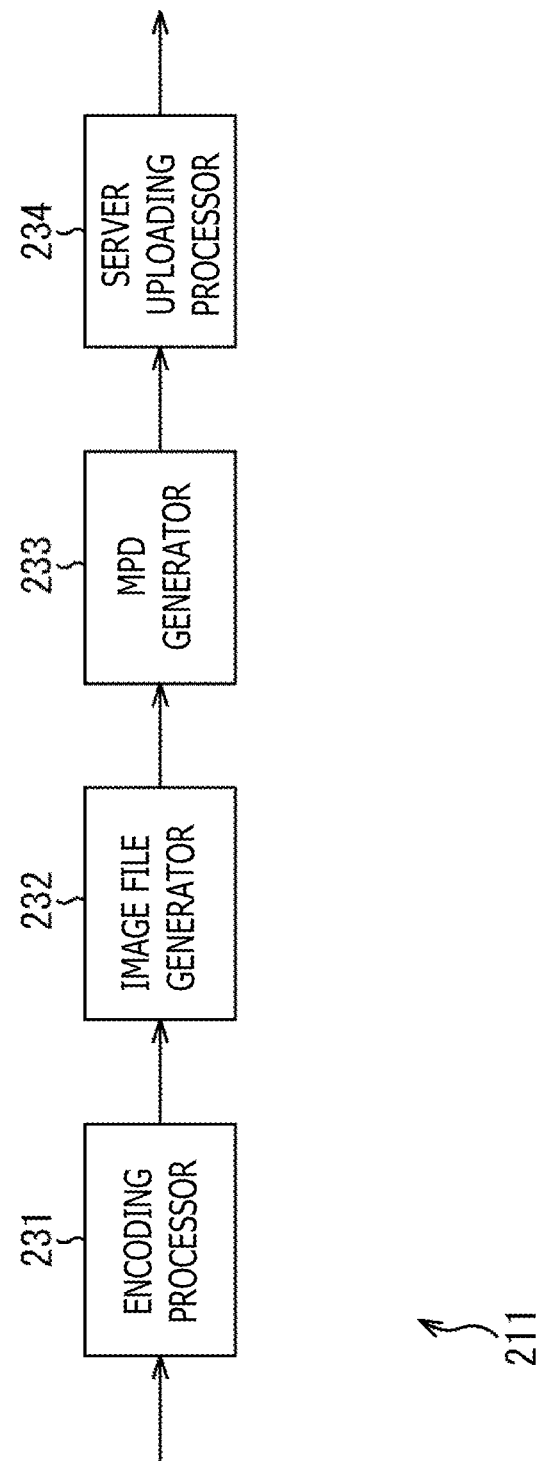
FIG. 19 is a block diagram depicting a configurational example of a file generating apparatus depicted in FIG. 18.

FIG. 19 is a block diagram depicting a configurational example of the file generating apparatus 211 depicted in FIG. 18.

The file generating apparatus 211 depicted in FIG. 19 includes an encoding processor 231, an image file generator 232, an MPD generator 233, and a server uploading processor 234.

The encoding processor 231 of the file generating apparatus 211 encodes a mosaic image as an image of a moving-image content at a plurality of encoding rates, thereby generating encoded streams. The encoding processor 231 supplies the encoded streams at the respective encoding rates to the image file generator 232.

The image file generator 232 converts the encoded streams at the respective encoding rates supplied from the encoding processor 231 into files each per segment, thereby generating image files. The image file generator 232 supplies the generated image files to the MPD generator 233.

The MPD generator 233 determines an URL, etc. of the Web server 12 for storing the image files supplied from the image file generator 232. The MPD generator 233 then generates an MPD file containing URLs, etc. of the image files. The MPD generator 233 supplies the generated MPD file and the image files to the server uploading processor 234.

The server uploading processor 234 uploads the image files and the MPD file supplied from the MPD generator 233 to the Web server 12 depicted in FIG. 18.

Example of a Mosaic Image

Figure 20:
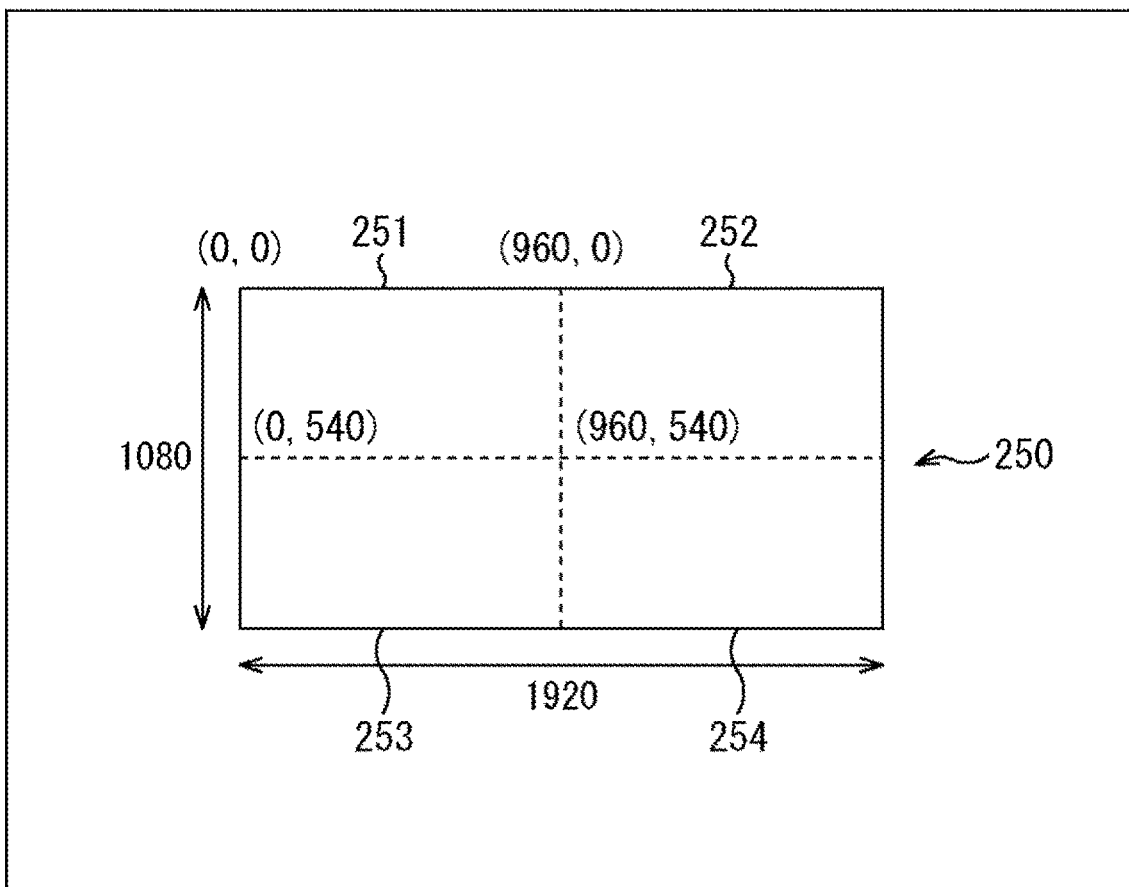
FIG. 20 is a diagram depicting an example of a mosaic image.

FIG. 20 is a diagram depicting an example of a mosaic image.

In the example depicted in FIG. 20, the mosaic image 250 is made up of an upper left thumbnail image 251, an upper right thumbnail image 252, a lower left thumbnail image 253, and a lower right thumbnail image 254. The mosaic image 250 has a resolution of 2 k (1920 pixels×1080 pixels), and all of the thumbnail images 251 through 254 have a resolution of 960 pixels×540 pixels.

Example of an Sgpd Box and an Leva Box

The segment structure of the image files of the mosaic image 250 depicted in FIG. 20 which is generated by the file generating apparatus 211 is the same as the segment structure depicted in FIG. 12 except for the sgpd box and the leva box. Therefore, only the sgpd box and the leva box will be described below.

Figure 21:
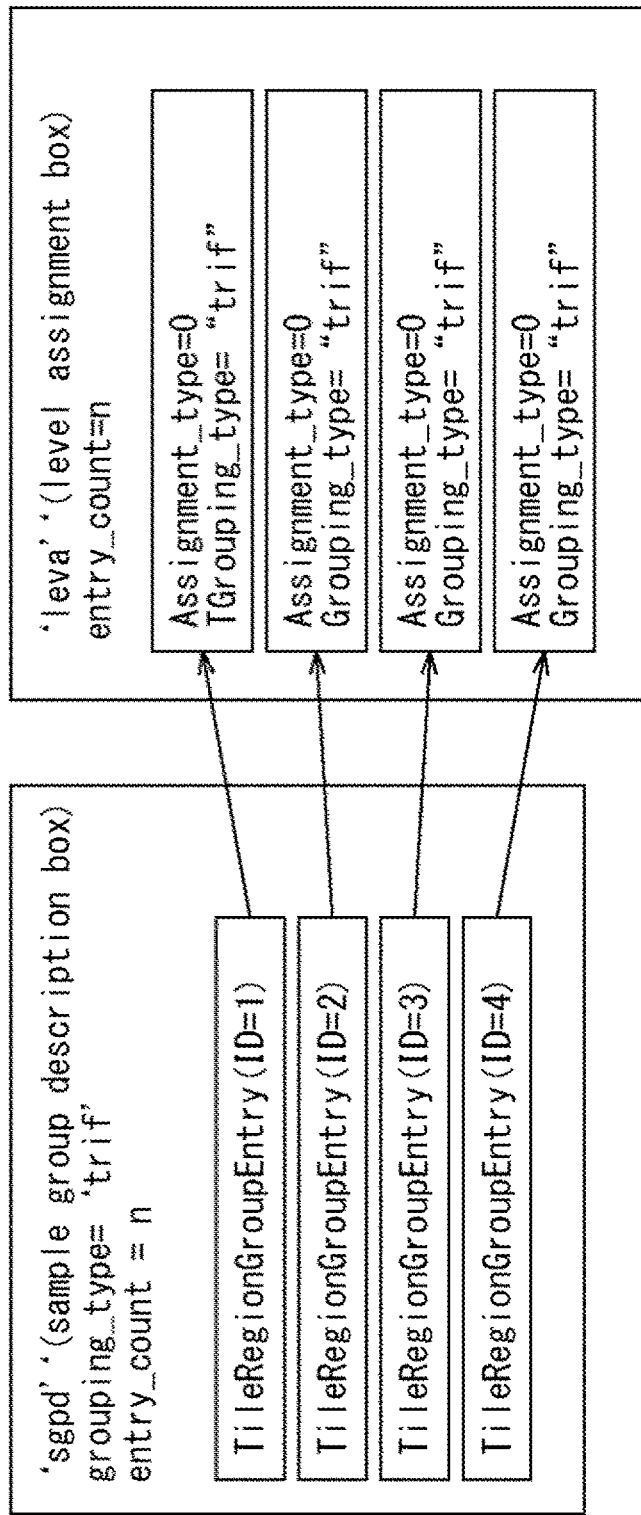
FIG. 21 is a diagram depicting an example of an sgpd box and an leva box in the third embodiment.

FIG. 21 is a diagram depicting an example of an sgpd box and an leva box of the image files of the mosaic image 250 depicted in FIG. 20.

Since the mosaic image 250 is made up of the four thumbnail images 251 through 254, fear Tile Region Group Entries are described in the sgpd box or the image files of the mosaic image 250, as depicted in FIG. 21.

In the example depicted in FIG. 21, the first Tile Region Group Entry corresponds to the thumbnail image 251 and is (1,0,0,960,540). The second Tile Region Group Entry corresponds to the thumbnail image 252 and is (2,960,0,960, 540). The third Tile Region Group Entry corresponds to the thumbnail image 253 and is (3,0,540,960,540). The fourth Tile Region Group Entry corresponds to the thumbnail image 254 and is (4,960,540,960,540).

The leva box has information of levels corresponding to the respective Tile Region Group Entries described therein successively from the information of the level corresponding to the first Tile Region Group Entry. The level for the thumbnail image 251 is set to 1, the level for the thumbnail image 252 to 2, the level for the thumbnail image 253 to 3, and the level for the thumbnail image 254 to 4.

assignment_type described as the information of each level is set to 0, and the type of Tile Region Group Entry is set to "trif" which represents the type of Tile Region Group Entry described in the sgpd box.

First Example of an MPD File

FIG. 22 is a diagram depicting a first example of an MPD file corresponding to the image files of the mosaic image 250 which are generated by the file generating apparatus 211 depicted in FIG. 18.

As depicted in FIG. 22, in the MPD file, "AdaptationSet" is described per encoded stream. Each "AdaptationSet" has "Representation" described therein, and "Representation" has the URL "stream.mp4" of the image files of the encoded streams of the mosaic image 250 described therein. Since levels are set for the encoded streams of the mosaic image 250, "SubRepresentation" per level can be described in "Representation."

Therefore, the "SubRepresentation" of level "1" has <SupplementalProperty schemeIdUri="urn:mpeg:dash:srd:2014" value="1,0,0,960,540,1920,1080"/> which represents the SRD of the thumbnail image 251 described therein. The SRD of the thumbnail image 251 is thus set in association with the position on the mosaic image 250 of the thumbnail image 251 indicated by the Tile Region Group Entry corresponding to level "1."

The "SubRepresentation" of level "2" has <SupplementalProperty schemeIdUri="urn:mpeg:dash:srd:2014" value="1,960,0,960,540,1920,1080"/> which represents the SRD of the thumbnail image 252 described therein. The SRD of the thumbnail image 252 is thus set in association with the position on the mosaic image 250 of the thumbnail image 252 indicated by the Tile Region Group Entry corresponding to level "2."

The "SubRepresentation" of level "3" has <SupplementalProperty schemeIdUri="urn:mpeg:dash:srd:2014" value="1,0,540,960,540,1920,1080"/> which represents the SRD of the thumbnail image 253 described therein. The SRD of the thumbnail image 253 is thus set in association with the position on the mosaic image 250 of the thumbnail image 253 indicated by the Tile Region Group Entry corresponding to level "3."

The "SubRepresentation" of level "4" has <SupplementalProperty schemeIdUri="urn:mpeg:dash:srd:2014" value="1,960,540,960,540,1920,1080"/> which represents the SRD of the thumbnail image 254 described therein. The SRD of the thumbnail image 254 is thus set in association with the position on the mosaic image 250 of the thumbnail image 254 indicated by the Tile Region Group Entry corresponding to level "4."

As described above, in the MPD file depicted in FIG. 22, the horizontal and vertical sizes of the mosaic image 250 indicated by Tile Region Group Entry are identical to the horizontal and vertical sizes of the screen indicated by the SRD. The horizontal and vertical coordinates on the mosaic image 250 indicated by Tile Region Group Entry corresponding to each level are identical to the horizontal and vertical positions on the screen indicated by the SRD corresponding to the level. When the MPD file depicted in FIG. 22 is generated, therefore, the screen where the thumbnail images 251 through 254 decoded on the basis of the SRDs are placed is identical to the mosaic image 250.

The "SubRepresentation" of each level also has URLs of moving images corresponding to the thumbnail images 251 through 254 of the level described therein. Specifically, the "SubRepresentation" of level "1" has the URL "http://example.com/a_service/my.mpd" of the moving image corresponding to the thumbnail image 251 described therein. The "SubRepresentation" of level "2" has the URL "http://example.com/b_service/my.mpd" of the moving image corresponding to the thumbnail image 252 described therein.

The "SubRepresentation" of level "3" has the URL "http://example.com/c_service/my.mpd" of the moving image corresponding to the thumbnail image 253 described therein. The "SubRepresentation" of level "4" has the URL "http://example.com/d_service/my.mpd" of the moving image corresponding to the thumbnail image 254 described therein.

Second Example of an MPD File

FIG. 23 is a diagram depicting a second example of an MPD file corresponding to the image files of the mosaic image 250 which are generated by the file generating apparatus 211 depicted in FIG. 18.

The MPD file depicted in FIG. 23 is different from the MPD file depicted in FIG. 22 only with respect to an SRD described in the "SubRepresentation" of each level.

Specifically, an the MPD file depicted in FIG. 23, the "SubRepresentation" of level "3" has <SupplementalProperty schemeIdUri="urn:mpeg:dash:srd:2014" value="1,0,0,960,540,1920,1080"/> which represents the SRD of the thumbnail image 253 described therein.

The "SubRepresentation" of level "4" has <SupplementalProperty schemeIdUri="urn:mpeg:dash:srd:2014" value="1,960,0,960,540,1920,1080"/> which represents the SRD of the thumbnail image 254 described therein.

The "SubRepresentation" of level "1" has <SupplementalProperty schemeIdUri="urn:mpeg:dash:srd:2014" value="1,0,540,960,540,1920,1080"/> which represents the SRD of the thumbnail image 251 described therein.

The "SubRepresentation" of level "2" has <SupplementalProperty schemeIdUri="urn:mpeg:dash:srd:2014" value="1,960,540,960,540,1920,1080"/> which represents the SRD of the thumbnail image 252 described therein.

As described above, in the MPD file depicted in FIG. 23, as with the MPD file depicted in FIG. 22, the horizontal and vertical sizes of the mosaic image 250 indicated by Tile Region Group Entry are identical to the horizontal and vertical sizes of the screen indicated by the SRD.

However, the horizontal and vertical coordinates on the mosaic image 250 indicated by Tile Region Group Entry corresponding to each level, are different from the horizontal and vertical positions on the screen indicated by the SRD corresponding to the level. When the MPD file depicted in FIG. 23 is generated, therefore, the screen where the thumbnail images 251 through 254 decoded on the basis of the SRDs are placed is different from the mosaic image 250.

Example of a Screen where Thumbnail Images Site Placed

Figure 24:
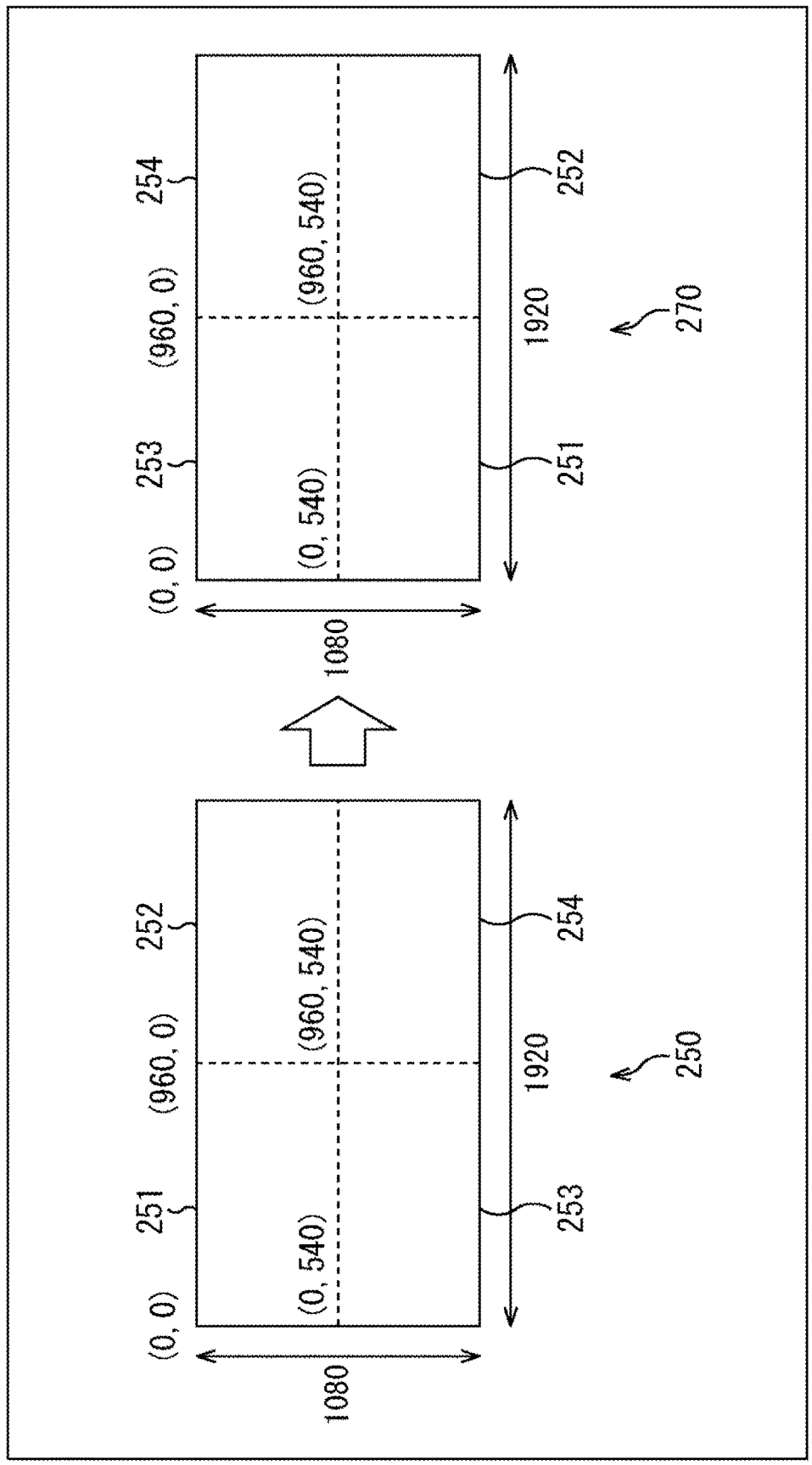
FIG. 24 is a diagram depicting an example of a screen where thumbnail images are placed.

FIG. 24 is a diagram depicting an example of a screen where the thumbnail images 251 through 254 decoded on the basis of the SRDs described in the MPD file depicted in FIG. 23 are placed.

The SRD of the thumbnail image 251 described in the MPD file depicted in FIG. 23 indicates that the coordinates of an upper left corner of the thumbnail image 251 on a screen 270 of 1920 pixels×1080 pixels are (0,540). Therefore, as depicted in FIG. 24, the thumbnail image 251 is placed in a lower left area of the screen 270.

The SRD of the thumbnail image 252 indicates that the coordinates of an upper left corner of the thumbnail image 252 on the screen 270 are (960,540). Therefore, as depicted in FIG. 24, the thumbnail image 252 is placed in a lower right area of the screen 270.

The SRD of the thumbnail image 253 indicates that the coordinates of an upper left corner of the thumbnail image 253 on the screen 270 of 1920 pixels×1080 pixels are (0,0). Therefore, as depicted in FIG. 24, the thumbnail image 253 is placed in an upper left area of the screen 270.

The SRD of the thumbnail image 254 indicates that the coordinates of an upper left corner of the thumbnail image 254 on the screen 270 are (960,0). Therefore, as depicted, in FIG. 24, the thumbnail image 254 is placed in an upper right, area of the screen 270.

As described above, with the MPD file depicted in FIG. 23, the layout of the thumbnail images 251 through 254 can be changed from the layout in the mosaic image 250 to be encoded to the layout in the screen 270 at the time they are displayed.

Description of a Process of the File Generating Apparatus

Figure 25:
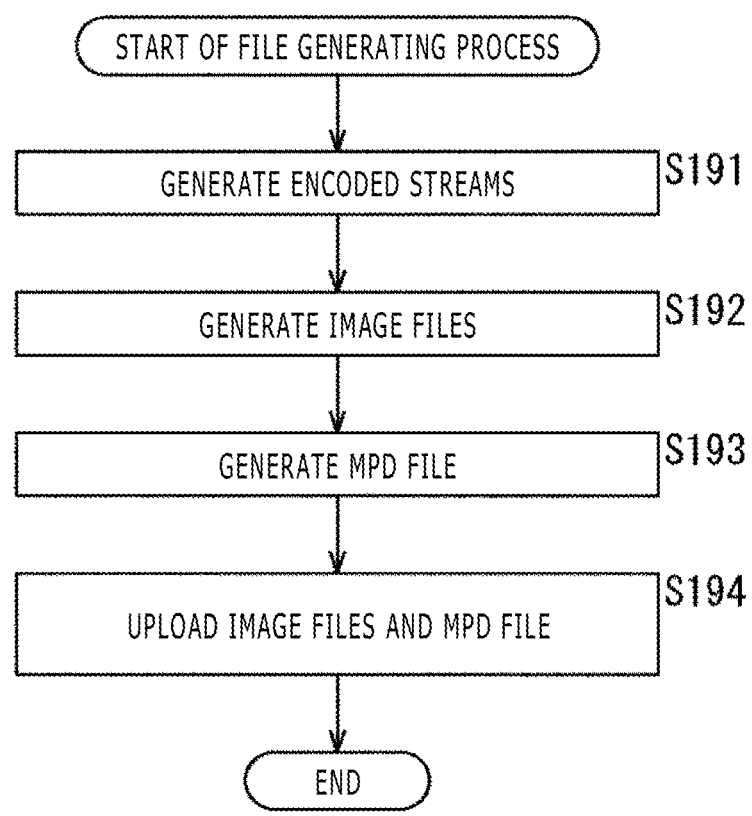
FIG. 25 is a flowchart of a file generating process of the file generating apparatus depicted in FIG. 19.

FIG. 25 is a flowchart of a file generating process of the file generating apparatus 211 depicted in FIG. 19.

In step S191 depicted in FIG. 25, the encoding processor 231 encodes a mosaic image as an image of a moving-image content at a plurality of encoding rates, thereby generating encoded streams. The encoding processor 231 supplies the encoded streams at the respective encoding rates to the image file generator 232.

In step S192, the image file generator 232 converts the encoded streams at the respective encoding rates supplied from the encoding processor 231 into files each per segment, thereby generating image files. The image file generator 232 supplies the generated image files to the MPD generator 233.

In step S193, the MPD generator 233 generates an MPD file containing URLs, etc. of the image files. The MPD generator 233 supplies the generated MPD file and the image flies to the server uploading processor 234.

In step S194, the server uploading processor 234 uploads the image files and the MPD file supplied from the MPD generator 233 to the Web server 12. The process now comes to an end.

Functional Configurational Example of a Moving-Image Playback Terminal

Figure 26:
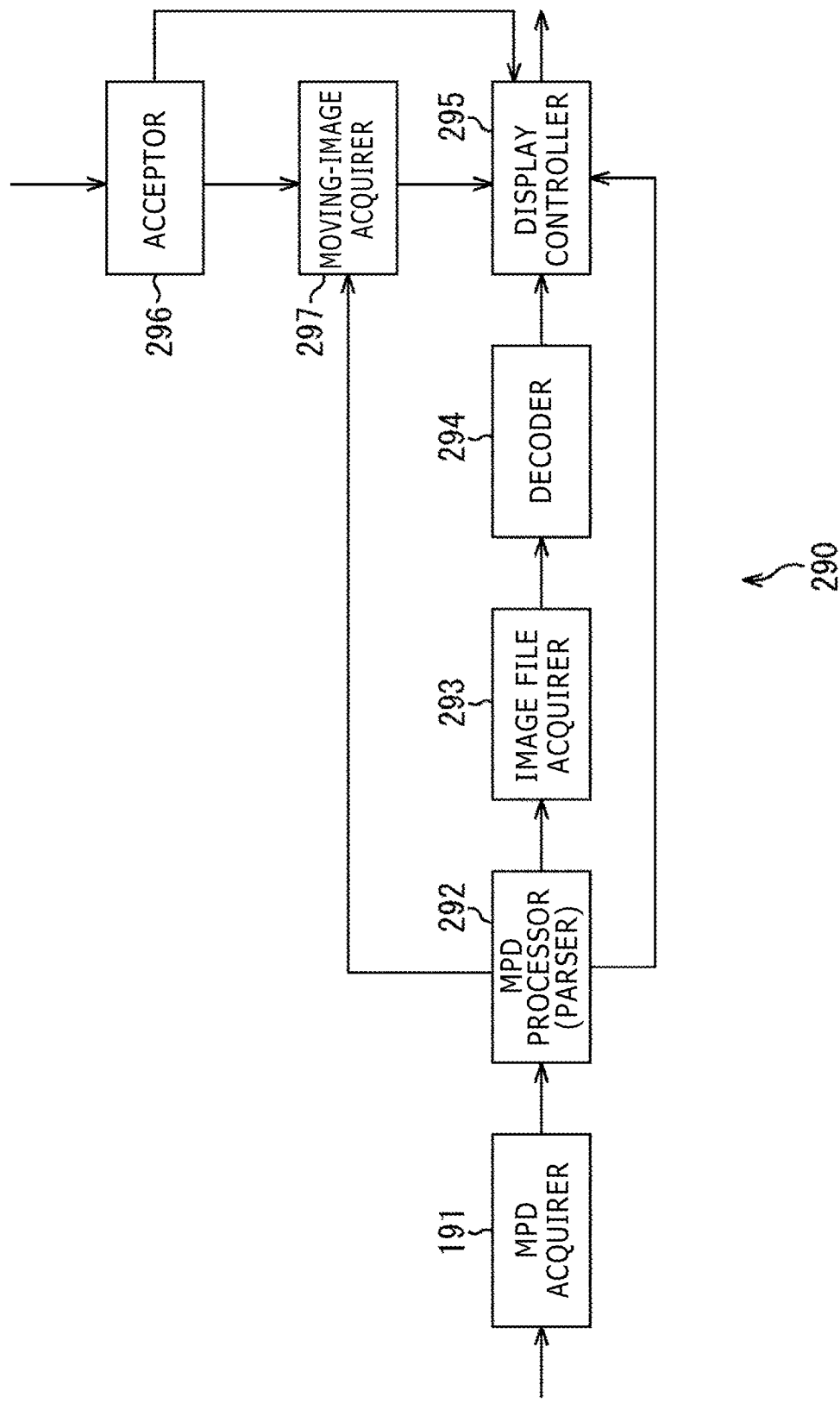
FIG. 26 is a block diagram depicting a configurational example of a streaming player implemented by a moving-image playback terminal depicted in FIG. 18.

FIG. 26 is a block diagram depicting a configurational example of a streaming player implemented by the moving-image playback terminal 14 depicted in FIG. 18 when it executes the control software 21, the moving-image playback software 22, and the access software 23.

Of the configurational details depicted in FIG. 26, those which are identical to the configurational details depicted in FIG. 10 are denoted by identical reference numerals. Redundant descriptions will be omitted as required.

A streaming player 230 depicted in FIG. 26 includes an MPD acquirer 191, an MPD processor 292, an image file acquirer 293, a decoder 294, a display controller 295, an acceptor 296, and a moving image acquirer 297.

The MPD processor 292 of the streaming player 290 extracts information such as URLs, etc. of the image files of segments to be played from the MPD file supplied from the MPD acquirer 191, and supplies the extracted information to the image file acquirer 293. The MPD processor 292 also supplies the MPD file to the moving image acquirer 297. The MPD processor 292 extracts the SRDs of the divided images of a mosaic image of the segments to be played from the MPD file, and supplies the extracted SRDs to the display controller 295.

The image file acquirer 293 requests the Web server 12 for the encoded streams of the image files that are specified by the URLs supplied from the MPD processor 292, and acquires the encoded streams. The image file acquirer 293 supplies the acquired encoded stream to the decoder 294.

The decoder 294 decodes the encoded streams supplied from the image file acquirer 293. The decoder 294 supplies a mosaic image obtained as a result of the decoding process to the display controller 295.

The display controller 295 (allocator) places the divided images of the mosaic image supplied from the decoder 294 on the screen on the basis of the SRDs supplied from the MPD processor 292. The display controller 235 superposes a cursor on the screen where the divided images are placed, and supplies the divided images with the superposed cursor to a display device, not depicted, which displays them.

In response to an instruction to enlarge a given region of the screen supplied from the acceptor 296, the display controller 295 enlarges the size of a partial mosaic image, of the screen where the mosaic image is placed, that includes only a thumbnail image contained in the region, up to the size of the screen. The display controller 295 superposes a cursor on the given thumbnail image in the screen where the enlarged partial mosaic image is placed, and supplies the thumbnail image with the superposed cursor to the display device, not depicted which displays them.

The display controller 295 supplies a moving image, supplied from the moving image acquirer 297, that corresponds to one of the thumbnail images being displayed, to the display device, not depicted, which displays the supplied moving image.

The acceptor 296 accepts an instruction from the user, etc. and supplies the instruction to the moving image acquirer 297 or the display controller 295.

In response to an instruction about a position supplied from the acceptor 296, the moving image acquirer 297 acquires the URL of a moving image corresponding to the position from the MPD file supplied from the MPD processor 292. The moving image acquirer 297 acquires a moving image from the Web server 12 or the like on the basis of the acquired URL, and supplies the acquired moving image to the display controller 295.

Outline of a Playback Process

Figure 27:
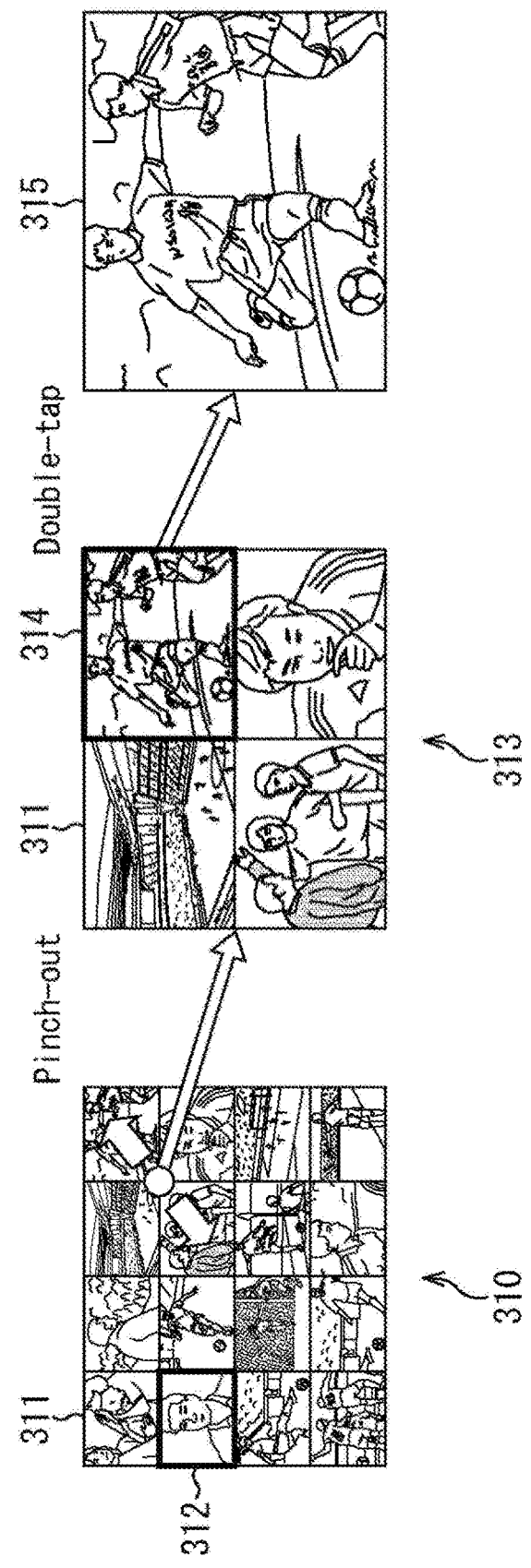
FIG. 27 is a diagram illustrative of an outline of a playback process of the streaming player depicted in FIG. 26.

FIG. 27 is a diagram illustrative of an outline of a playback process of the streaming player 290 depicted in FIG. 26.

As depicted in a left section of FIG. 27, the display controller 295 puts a cursor 312 on a given thumbnail image 311 of 4×4 thumbnail images 311 that make up a mosaic image 310 placed in the screen, and controls the display device, not depicted, to display the given thumbnail image 311.

At this time, the user gives an instruction to enlarge a desired region while seeing the screen of the mosaic image 310 with the cursor 312 superposed thereon. In the example depicted in FIG. 27, the user gives an instruction to enlarge the region of 2×2 thumbnail images 311 in an upper right area of the screen where the mosaic image 310 is placed.

In response to the enlarging instruction, the display controller 295 enlarges the size of a partial mosaic image 313 which is made up of only the 2×2 thumbnail images 311, of the screen where the mosaic image 310 is placed, to the size of the screen. Then, as depicted in a central section of FIG. 27, the display controller 295 superposes a cursor 314 on a given thumbnail image 311 in the screen where the enlarged partial mosaic image 313 is placed, and controls the display device, not depicted, to display the thumbnail image 311.

At this time, the user moves the cursor 314 to a desired thumbnail image 311 and performs an action such as a double tap or the like thereon, indicating a position for the cursor 314, In the example depicted in FIG. 27, the user indicates the position of an upper right thumbnail image 311.

In response to the user's instruction, the moving image acquirer 297 acquires the URL of the moving image corresponding to the SRD that indicates the position on the screen of the mosaic image 310 corresponding to the position on the indicated partial mosaic image 313, from the MPD file, as the URL of a moving image corresponding to the indicated position. Then, based on the acquired URL, the moving image acquirer 297 acquires a moving image 315 from the Web server 12 or the like, and supplies the acquired moving image 315 to the display controller 295. As depicted in a right section of FIG. 27, the display controller 295 controls the display device, not depicted, to display the moving image 315.

Description of a Process of the Moving-Image Playback Terminal

Figure 28:
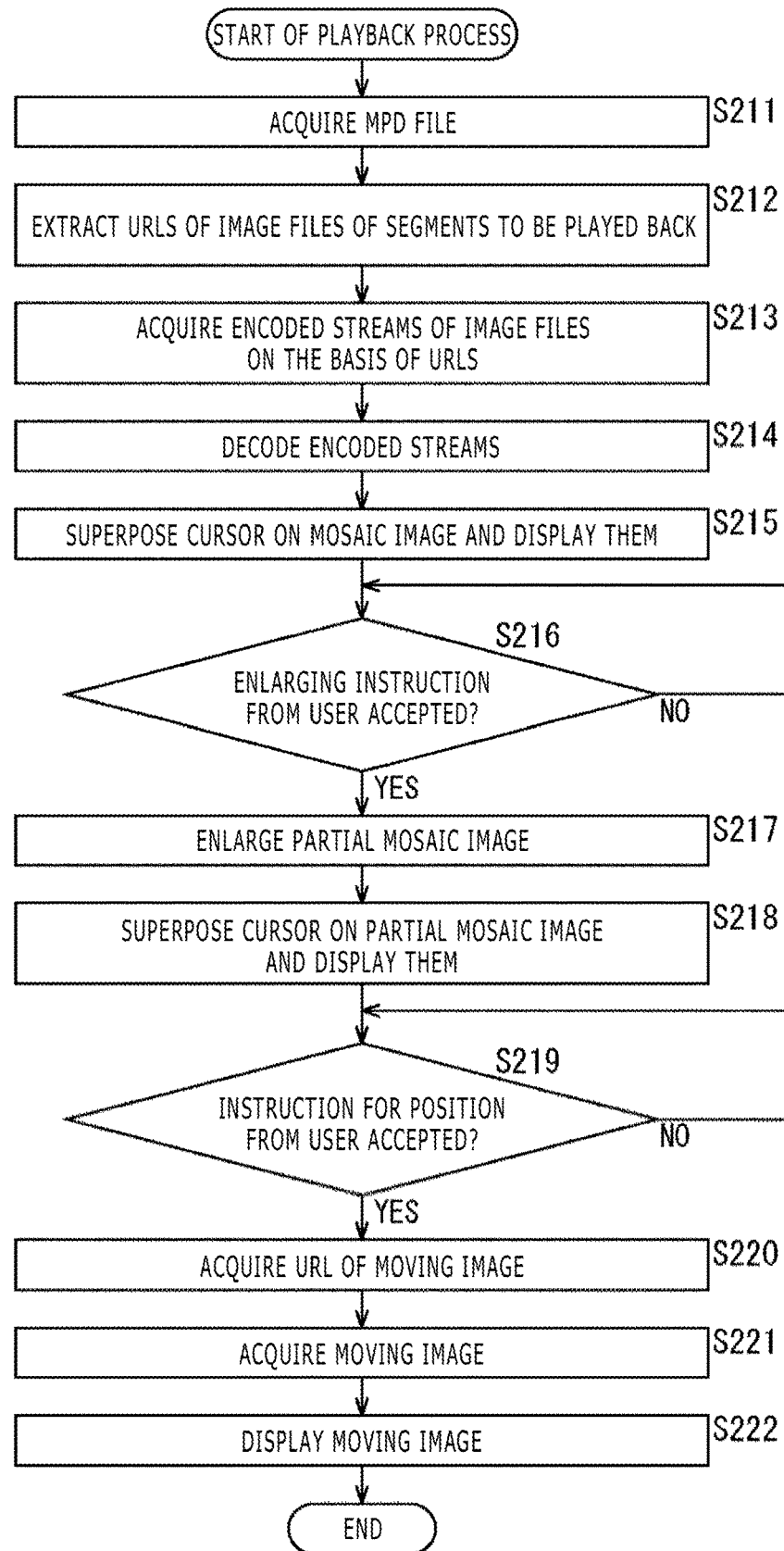
FIG. 28 is a flowchart of the playback process of the streaming player depicted in FIG. 26.
Figure 29:
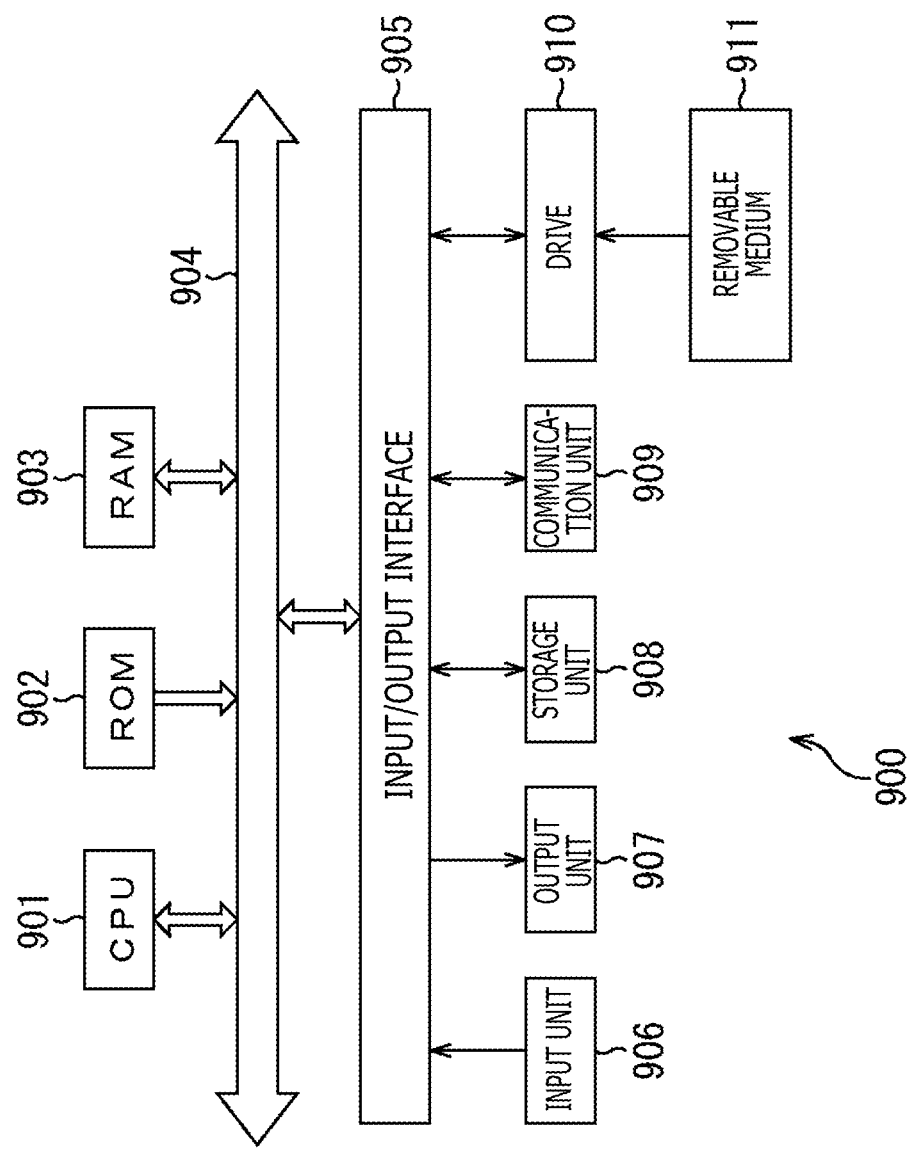
FIG. 29 is a block diagram depicting a configurational example of the hardware of a computer.

FIG. 28 is a flowchart of a playback process of the streaming player 290 depicted in FIG. 26.

In step S211 depicted in FIG. 28, the MPD acquirer 191 of the streaming player 290 acquires the MPD file from the Web server 12 and supplies the acquired MPD file to the MPD processor 292.

In step S212, the MPD processor 292 extracts information such as URLs, etc. of the image files of segments to be played from the MPD file supplied from the MPD acquirer 191, and supplies the extracted information to the image file acquirer 293. The MPD processor 292 also supplies the MPD file to the moving image acquirer 297. The MPD processor 292 extracts the SRDs of the divided images of a mosaic image of the segments to be played from the MPD file, and supplies the extracted SRDs to the display controller 295.

In step S213, the image file acquirer 293 requests the Web server 12 for the encoded streams of the image files that are specified by the URLs supplied from the MPD processor 292, and acquires the encoded streams. The image file acquirer 293 supplies the acquired encoded stream to the decoder 294.

In step S214, the decoder 294 decodes the encoded streams supplied from the image file acquirer 293. The decoder 294 supplies a mosaic image obtained as a result of the decoding process to the display controller 295.

In step S215, the display controller 295 places the divided images of the mosaic image from the decoder 294 on the screen OR the basis of the SRDs from the MPD processor 292, superposes a cursor or the like on the screen, and supplies the divided images with the superposed cursor to the display device, not depicted, which displays them.

In step S216, the acceptor 296 determines whether it has accepted an instruction to enlarge a given region of the screen from the user or not. If the acceptor 296 decides that it has not accepted an instruction to enlarge a given region of the screen from the user in step S216, then the acceptor 296 waits until it accepts an instruction to enlarge a given region of the screen.

If the acceptor 296 decides that it has accepted an instruction to enlarge a given region of the screen from the user in step S216, then the acceptor 296 supplies the enlarging instruction to the display controller 295. In step S217, in response to the enlarging instruction supplied from the acceptor 296, the display controller 295 enlarges the size of a partial mosaic image, of the screen where the mosaic image is placed, that includes only a thumbnail image contained in the region instructed to be enlarged, up to the size of the screen.

In step S218, the display controller 295 superposes a cursor or the like on a given thumbnail image in the screen where the enlarged partial mosaic image is placed, supplies the thumbnail image with the superposed cursor to the display device, not depicted, which displays them. At this time, the user moves the cursor to a desired thumbnail image and performs an action such as a double tap or the like thereon, indicating a position for the cursor on the screen.

In step S219, the acceptor 296 determines whether it has accepted an instruction for a position on the screen from the user or not. If the acceptor 296 decides that it has not accepted an instruction for a position on the screen in step S219, then the acceptor 296 waits until it accepts an instruction for a position on the screen.

If the acceptor 296 decides that it has accepted an instruction for a position on the screen in step S219, then the acceptor 296 supplies the instruction to the moving image acquirer 297. In step S220, in response to the instruction from the acceptor 296, the moving image acquirer 297 acquires the URL of a moving image corresponding to the indicated position from the MPD file supplied from the MPD processor 292.

In step S221, the moving image acquirer 297 acquires a moving image from the Web server 12 or the like on the basis of the acquired URL, and supplies the acquired moving image to the display controller 295.

In step S222, the display controller 295 supplies the moving image supplied from the moving image acquirer 297 to the display device, not depicted, which displays it. The process is now ended.

In the third embodiment, a partial mosaic image is displayed after a mosaic image has been displayed, and a position on the partial mosaic image is indicated by the user. However, a partial mosaic image say not be displayed, and a position on the mosaic image may be indicated directly by the user.

Fourth Embodiment

Description of a Computer to which the Present Disclosure is Applied

The above sequence of processes may be hardware-implemented or software-implemented. If the sequence of processes is software-implemented, then software programs are installed in a computer. The computer may be a computer incorporated in dedicated hardware or a general-purpose personal computer which is capable of performing various functions by installing various programs.

FIG. 29 is a block diagram depicting a configurational example of the hardware of a computer that executes the above sequence of processes based on programs.

A computer 900 includes a CPU (Central Processing Unit) 901, a ROM (Read Only Memory) 902, and a RAM (Random Access Memory) 903 that are connected to each other by an bus 904.

An input/output interface 905 is connected to the bus 904. To the input/output interface 905, there are connected an input unit 906, an output unit 907, a storage unit 908, a communication unit 909, and a drive 910.

The input unit 906 includes a keyboard, a mouse, and a microphone, etc. The output unit 907 includes a display and a speaker, etc. The storage unit 908 includes a hard disk and a non-volatile memory, etc. The communication unit 909 includes a network interface, etc. The drive 910 works on a removable medium 911 such as a magnetic disk, an optical disk, a magneto-optical disk, a semiconductor memory, or the like.

In the computer 900 thus constructed, the CPU 901 loads programs stored in the storage unit 908, for example, through the input/output interface 905 and the bus 904 into the RAM 903 and executes the programs to perform the processes described above.

The programs run by the computer 900 (the CPU 901) can be recorded on and provided by the removable medium 911 as a package medium or the like, for example. The programs can also be provided through a wired or wireless transmission medium such as a local area network, the Internet, or a digital satellite broadcast.

In the computer 900, the programs can be installed in the storage unit 908 through the input/output interface 905 when the removable medium 911 is inserted into the drive 910. The programs can also be received by the communication unit 909 through a wired or wireless transmission medium and installed in the storage unit 908. The programs can alternatively be pre-installed in the ROM 902 or the storage unit 908.

The programs that are executed by the computer 900 may be programs in which processes are carried out in chronological order in the sequence described above, or may be programs in which processes are carried out parallel to each other or at necessary timings as when called for.

In the present specification, the term "system" means a collection of components (apparatus, modules (parts), or the like), and it does not matter whether all the components are present in the same housing or not. Therefore, both a plurality of apparatus housed in each housing and connected by a network, and a single apparatus having a plurality of modules housed in one housing may be referred to as a system.

The advantages referred to above in the present specification are only illustrative, but not limitative, do not preclude other advantages.

The embodiments of the present disclosure are not limited to the above embodiments, and various changes may be made therein without departing from the scope of the present disclosure.

The present disclosure may be presented in the following configurations:

(1)
An information processing apparatus including:
a setting section that sets a position protruding out of a screen as a position on the screen of an image made up of a plurality of divided images compatible with encoded streams.

(2)
The information processing apparatus according to (1), in which the plurality of divided images are images of facing ends which are part of an entire celestial sphere image or a panoramic image.

(3)
The information processing apparatus according to (1) or (2), in which the setting section sets the position of the image on the screen in a management file for managing files of the encoded streams.

(4)
An information processing method including:
a setting step that sets a position protruding out of a screen as a position on the screen of an image made up of a plurality of divided images compatible with encoded streams in an information processing apparatus.

(5)
An information processing apparatus including: an allocator that places an image obtained by decoding encoded streams on a screen, on the basis of a position protruding out of the screen which is set as a position on the screen of the image which is made up of a plurality of divided images compatible with the encoded streams.

(6)
The information processing apparatus according to (5), in which the plurality of divided images are images of facing ends which are part of an entire celestial sphere image or a panoramic image.

(7)
The information, processing apparatus according to (5) or (6), in which the position of the image on the screen is set in a management file for managing files of the encoded streams.

(8)
An information processing method including:
an allocating step that places an image obtained by decoding encoded streams on a screen, on the basis of a position protruding out of the screen which is set as a position on the screen of the image which is made up of a plurality of divided images compatible with the encoded streams in an information processing apparatus.

(9)
An information processing apparatus including:
a setting section that sets positions on a screen of respective divided images of an image which is made up of a plurality of divided images compatible with encoded streams, in association with positions of the divided images on the image.

(10)
The information processing apparatus according to (9), in which the image is part of an entire celestial sphere image or a panoramic image, or a mosaic image.

(11)
The information processing apparatus according to (9) or (10), in which the encoded streams are encoded streams representing the divided images encoded as different tiles.

(12)
The information processing apparatus according to any one of (9) through (11), in which the setting section sets the position of the image on the screen in a management file for managing files of the encoded streams.

(13)
An information processing method including:
a setting step that sets positions on a screen of respective divided images of an image which is made up of a plurality of divided images compatible with encoded streams, in association with positions of the divided images on the image in an information processing apparatus.

(14)
An information processing apparatus including:
an allocator that places divided images of an image obtained by decoding encoded streams on a screen, on the basis of positions on the screen of the divided images of the image which are set in association with positions on the image which is made up of a plurality of divided images compatible with the encoded streams.

(15)

The information processing apparatus according to (14), in which the image is part of an entire celestial sphere image or a panoramic image, or a mosaic image.

(16)

The information processing apparatus according to (14) or (15), in which the encoded streams are encoded streams representing the divided images encoded as different tiles.

(17)

The information processing apparatus according to any one of (14) through (16), in which the position of the image on the screen is set in a management file for managing files of the encoded streams.

(18)

An information processing method including:

an allocating step that places divided images of an image obtained by decoding encoded streams on a screen, on the basis of positions on the screen of the divided images of the image which are set in association with positions on the image which is made up of a plurality of divided images compatible with the encoded streams in an information processing apparatus.

REFERENCE SIGNS LIST

11 File generating apparatus, 14 Moving-image playback terminal, 170 Entire celestial sphere image, 173-1 Left end image, 173-2 Right end image, 180 Screen, 195 Allocator, 211 File generating apparatus, 250 Mosaic image, 251 Through 254 Thumbnail image.

The invention claimed is:

1. An information processing apparatus comprising:
circuitry configured to
request partial images related to an image obtained by dividing an entire celestial sphere image or a panoramic image into a plurality of partial images including the requested partial images,
receive an encoded stream such that a first requested partial image of the plurality of partial images constituting a first end portion and a second requested partial image of the plurality of partial images opposite to the first requested partial image comprise one continuous image among the plurality of partial images, and
decode information of a position of the one continuous image with respect to the entire celestial sphere image or the panoramic image when at least one of the first requested partial image or the second requested partial image is out of the range of the entire celestial sphere image or the panoramic image.

2. The information processing apparatus according to claim 1, wherein the circuitry decodes the information of the position of the one continuous image on a screen using a management file for managing files of the encoded stream.

3. An information processing method, executed via at least one processor, the method comprising:
requesting partial images related to an image obtained by dividing an entire celestial sphere image or a panoramic image into a plurality of partial images including the partial images;
receiving an encoded stream such that a first requested partial image of the plurality of partial images constituting a first end portion and a second requested partial image of the plurality of partial images opposite to the first requested partial image comprise one continuous image among the plurality of partial images; and
decoding information of a position of the one continuous image with respect to the entire celestial sphere image or the panoramic image when at least one of the first requested partial image and the second requested partial image is out of the range of the entire celestial sphere image or the panoramic image.

4. An information processing apparatus comprising:
circuitry configured to
request partial images related to an image obtained by dividing an entire celestial sphere image or a panoramic image into a plurality of partial images including the requested partial images,
receive an encoded stream such that a first requested partial image of the plurality of partial images constituting a first end portion and a second requested partial image of the plurality of partial images opposite to the first requested partial image comprise one continuous image among the plurality of partial images, and
output one or more of the requested partial images of the image obtained by decoding the encoded stream on a screen, on the basis of a position of the one continuous image with respect to the entire celestial sphere image or the panoramic image.

5. The information processing apparatus according to claim 4, wherein the position of the one continuous image on the screen is set in a management file for managing files of the encoded stream.

6. An information processing method, executed via at least one processor, the method comprising:
requesting partial images related to an image obtained by dividing an entire celestial sphere image or a panoramic image into a plurality of partial images including the requested partial images;
receiving an encoded stream such that a first requested partial image of the plurality of partial images constituting a first end portion and a second requested partial image of the plurality of partial images opposite to the first requested partial image comprise one continuous image among the plurality of partial images; and
outputting one or more of the requested partial images of the image obtained by decoding the encoded stream on a screen, on the basis of a position protruding out of the screen which is set as a position of the one continuous image with respect to the entire celestial sphere image or the panoramic image.

7. An information processing apparatus comprising:
circuitry configured to
request partial images related to an image obtained by dividing an entire celestial sphere image or a panoramic image into a plurality of partial images including the requested partial images,
generate an encoded stream such that a first requested partial image of the plurality of partial images constituting a first end portion and a second requested partial image of the plurality of partial images opposite to the first requested partial image comprise one continuous image among the plurality of partial images, and
decode information of positions on a screen of respective partial images of the plurality of partial images, including information of a position of the one continuous image with respect to the entire celestial sphere image or the panoramic image.

8. The information processing apparatus according to claim 7, wherein the encoded stream comprises the requested partial images encoded as different tiles.

9. The information processing apparatus according to claim 7, wherein the circuitry decodes information of the position of the one continuous image on the screen using a management file for managing files of the encoded stream.

10. An information processing method, executed via at least one processor, the method comprising:
requesting partial images related to an image obtained by dividing an entire celestial sphere image or a panoramic image into a plurality of partial images including the requested partial images;
receiving an encoded stream such that a first requested partial image of the plurality of partial images constituting a first end portion and a second requested partial image of the plurality of partial images opposite to the first requested partial image comprise one continuous image among the plurality of partial images; and
decoding information of positions on a screen of respective partial images of the plurality of partial images, including information of a position of the one continuous image with respect to the entire celestial sphere image or the panoramic image.

11. An information processing apparatus comprising:
circuitry configured to
to request partial images related to an image obtained by dividing an entire celestial sphere image or a panoramic image into a plurality of partial images including the requested partial images,
receive an encoded stream such that a first requested partial image of the plurality of partial images constituting a first end portion and a second requested partial image of the plurality of partial images opposite to the first requested partial image comprise one continuous image among the plurality of partial images, and
output one or more of the requested partial images of the image obtained by decoding the encoded stream on a screen, on the basis of positions on the screen of the plurality of partial images, including a position of the one continuous image with respect to the entire celestial sphere image or the panoramic image.

12. The information processing apparatus according to claim 11, wherein the encoded stream comprises the requested partial images encoded as different tiles.

13. The information processing apparatus according to claim 11, wherein the position of the one continuous image on the screen is set in a management file for managing files of the encoded stream.

14. An information processing method, executed via at least one processor, the method comprising:
requesting partial images related to an image obtained by dividing an entire celestial sphere image or a panoramic image into a plurality of partial images including the requested partial images;
receiving an encoded stream such that a first requested partial image of the plurality of partial images constituting a first end portion and a second requested partial image of the plurality of partial images opposite to the first requested partial image comprise one continuous image among the plurality of partial images; and
outputting one or more of the requested partial images of the image by decoding the encoded stream on a screen, on the basis of positions on the screen of the plurality of partial images, including a position of the one continuous image with respect to the entire celestial sphere image or the panoramic image.

* * * * *